(12) United States Patent
Hayata

(10) Patent No.: US 12,477,193 B2
(45) Date of Patent: Nov. 18, 2025

(54) VIDEO PROCESSING METHOD AND VIDEO PROCESSING SYSTEM

(71) Applicant: GREE, Inc., Tokyo (JP)

(72) Inventor: Daiki Hayata, Tokyo (JP)

(73) Assignee: GREE HOLDINGS, INC., Tokyo (JP)

( * ) Notice: Subject to any disclaimer, the term of this patent is extended or adjusted under 35 U.S.C. 154(b) by 144 days.

(21) Appl. No.: 18/399,775

(22) Filed: Dec. 29, 2023

(65) Prior Publication Data

US 2024/0334026 A1 Oct. 3, 2024

(30) Foreign Application Priority Data

Mar. 31, 2023 (JP) .................................. 2023-057975

(51) Int. Cl.
| | |
|---|---|
| H04N 21/81 | (2011.01) |
| G06T 7/20 | (2017.01) |
| G06T 7/70 | (2017.01) |
| G06T 19/20 | (2011.01) |

(52) U.S. Cl.
CPC ............. *H04N 21/816* (2013.01); *G06T 7/20* (2013.01); *G06T 7/70* (2017.01); *G06T 19/20* (2013.01); *G06T 2219/2004* (2013.01)

(58) Field of Classification Search
CPC ....................................................... G06T 7/70
See application file for complete search history.

(56) References Cited

U.S. PATENT DOCUMENTS

| | | | |
|---|---|---|---|
| 8,339,418 B1 * | 12/2012 | Nesmith ................. | G06T 15/50 |
| | | | 345/633 |
| 2019/0349636 A1 | 11/2019 | Watanabe et al. | |
| 2022/0258059 A1 * | 8/2022 | Murcin ................... | A63F 13/65 |
| 2022/0297006 A1 | 9/2022 | Baba et al. | |
| 2025/0046016 A1 * | 2/2025 | Polyakov ............. | H04N 19/136 |

FOREIGN PATENT DOCUMENTS

| | | |
|---|---|---|
| JP | 2017-029509 A | 2/2017 |
| JP | 2019-197961 A | 11/2019 |
| JP | 2020-119334 A | 8/2020 |
| JP | 2021-035454 A | 3/2021 |
| JP | 2021-51578 A | 4/2021 |
| JP | 2022-78994 A | 5/2022 |

OTHER PUBLICATIONS

Japanese Office Action issued Nov. 7, 2023, in corresponding Japanese Application No. 2023-057975, 8 pages.
Office Action issued May 7, 2025 in Japanese Patent Application No. 2024-020882.
Notice of Reasons for Refusal mailed on Jun. 27, 2023, received for JP Application 2023-057975, 10 pages including English Translation.
Office Action issued Oct. 7, 2025 in Japanese Patent Application No. 2024-020882.

\* cited by examiner

*Primary Examiner* — Shivang I Patel

(74) *Attorney, Agent, or Firm* — XSENSUS LLP

(57) ABSTRACT

A video processing method executed by processing circuitry, the video processing method comprises obtaining at least one format element which is used to generate a first video including a first avatar in a virtual space; and generating a second video, including a second avatar different from the first avatar, using a selection format element which is selected from the at least one format element.

22 Claims, 14 Drawing Sheets

| FORMAT VIDEO IDENTIFICATION INFORMATION | CREATOR USER IDENTIFICATION INFORMATION | FORMAT VIDEO INFORMATION | FORMAT DATA |
|---|---|---|---|
| VIDEO ID | USER ID | VIDEO FRAME, VIDEO DATA | VIRTUAL SPACE IDENTIFICATION INFORMATION, COORDINATE INFORMATION, AVATAR MOTION DATA ETC. |

| FORMAT DATA IDENTIFICATION INFORMATION | CREATOR USER IDENTIFICATION INFORMATION | FORMAT DATA |
|---|---|---|
| FORMAT DATA ID | USER ID | ORIGINAL FORMAT DATA |

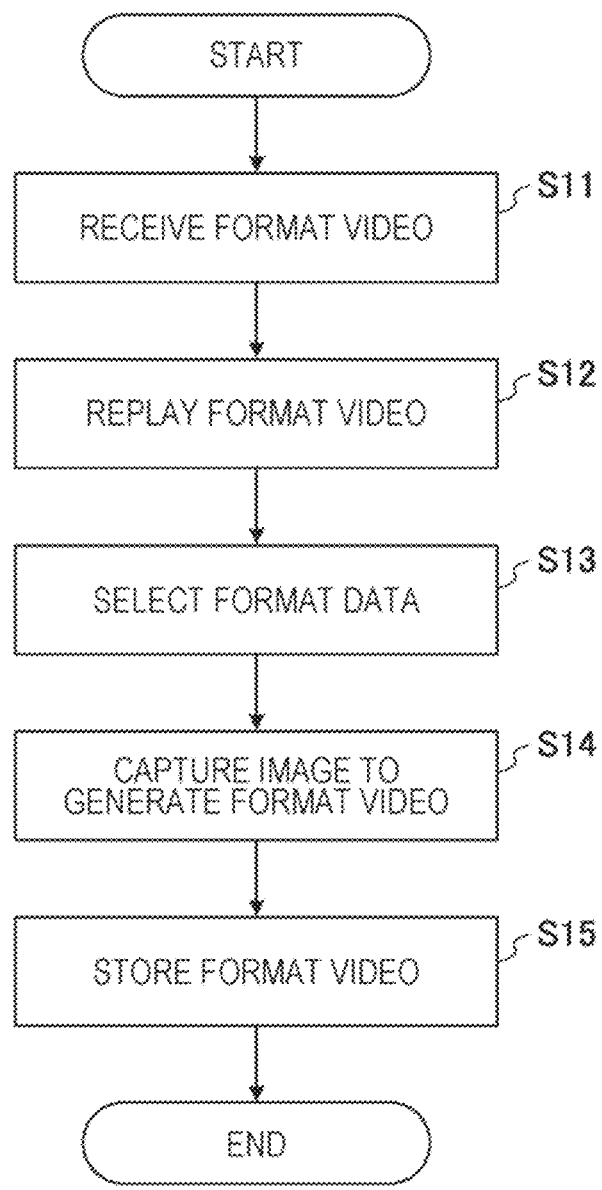

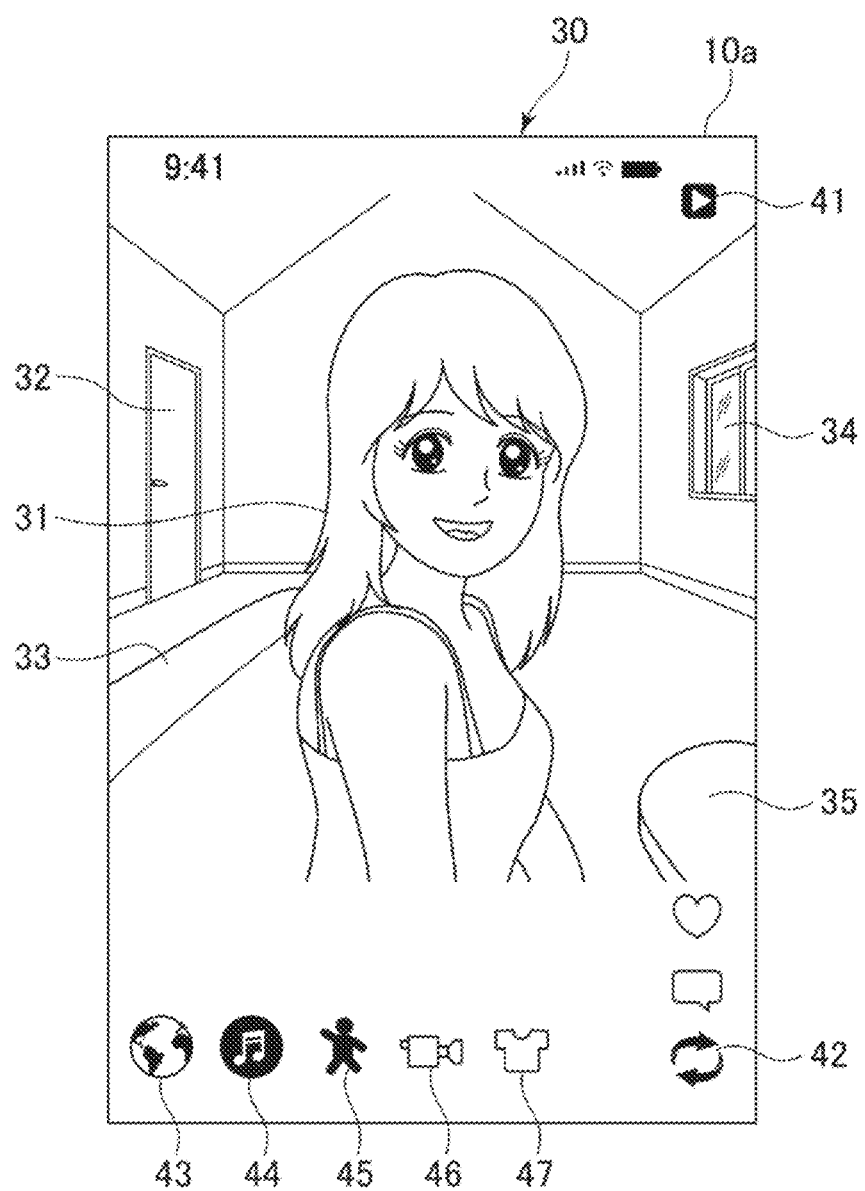

VIDEO PROCESSING METHOD AND VIDEO PROCESSING SYSTEM

CROSS-REFERENCE TO RELATED APPLICATION

The present application is a continuation of and claims priority to JP 2023-057975, filed in Japan on Mar. 31, 2023, the entire contents of which is incorporated by reference.

TECHNICAL FIELD

The present disclosure relates to a video processing method, a video processing system and video processing program.

BACKGROUND

Conventional systems may store reproduction information needed to reproduce a video along with images constituting the video, and reproduce the video based on the reproduction information. For example, a conventional game system may, after an image file is generated by capturing the game screen of a game played by a user, include reproduction information (needed to reproduce the scene of the game at the time of capturing) as metadata in the image file. Doing so may allow another user who has designated the image file to start the game from the scene reproduced by the reproduction information included in the image file.

SUMMARY

In an exemplary implementation of the present disclosure, a video processing method is executed by processing circuitry, the video processing method comprises obtaining at least one format element which is used to generate a first video including a first avatar in a virtual space; and generating a second video, including a second avatar different from the first avatar, using a selection format element which is selected from the at least one format element.

BRIEF DESCRIPTION OF THE DRAWINGS

FIG. 5 is a table for illustrating video management information stored in the video processing system of FIG. 1;

FIG. 6 is a table for illustrating format data management information stored in the video processing system of FIG. 1;

FIG. 7 is a flowchart for illustrating a flow of process to produce a video utilizing format data;

FIG. 8 is a view illustrating an example of an image displayed on a user device;

DETAILED DESCRIPTION

Services using an image in a virtual space, such as a computer game and a video streaming service, may be utilized by many users. The inventors of the present disclosure have recognized that a video and a still image generated from a virtual space are rarely utilized in a form other than streaming to users. The inventors have developed the technology of the present disclosure which provides a method of utilizing a video generated from a virtual space.

An aspect of the present disclosure relates to a video processing method to be executed by one or a plurality of processors. A video processing method according to an aspect includes: obtaining one or a plurality of format elements used to generate a first video including a first avatar in a virtual space; and generating a second video including a second avatar different from the first avatar using one or a plurality of selection format elements selected from the one or a plurality of format elements.

Hereinafter, embodiments of various technologies disclosed herein will be described as appropriate with reference to the drawings. Note that components which are common in a plurality of drawings are labeled with the same reference symbol in the plurality of drawings.

The embodiments of the present disclosure described below does not limit the claims. The elements described in the following embodiments are not necessarily required for means for solving problems discussed and not discussed in the disclosure.

1. Outline of Video Processing System 1

1-1. System Configuration

Figure 1:
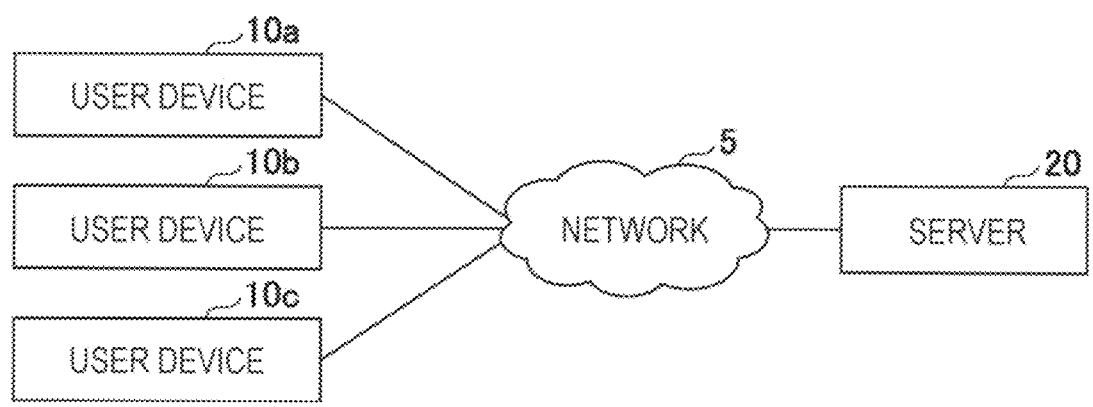
FIG. 1 is a block diagram illustrating a video processing system according to an embodiment.

FIG. 1 is a block diagram illustrating a video processing system 1 according to an embodiment. The video processing system 1 illustrated in FIG. 1 includes a user device 10*a*, a user device 10*b*, a user device 10*c*, and a server 20. The server 20 is communicably connected to the user device 10*a*, the user device 10*b*, and the user device 10*c* each other via a network 5. The network 5 may be a single network, or may be constructed by connecting a plurality of networks. The network 5 is e.g., the Internet, a mobile communication network, or a combination of these. The network 5 may be any network that enables communication between electronic devices.

The server 20 provides a service utilizing virtual space (virtual space platform) to the user device 10*a*, the user device 10*b*, and the user device 10*c*. In FIG. 1, for the sake of simplicity of description, only three user devices are illustrated; however, the server 20 can provide a service using virtual space to many user devices greater than three in number. In the present disclosure, for the convenience of description, it is assumed that the user device 10a is used by user A, the user device 10b is used by user B. and the user device 10c is used by user C. In addition, in the present disclosure, devices used by users to utilize the video streaming service provided by the server 20 may be collectively referred to as "user device 10" or "user device", and users utilizing the service of the server 20 using the "user device" may be collectively referred to as "user". The user devices 10a, 10b, 10c are each an example of the "user device", and the user A, the user B, the user C are each an example of a "user" utilizing the service of the server 20.

In the virtual space provided by the server 20, a world defined by a three-dimensional global coordinate system may be set. For example, the user A can place its own avatar in the virtual space provided by the server 20. When the avatar of user A is placed in the virtual space, the server 20 captures the virtual space by a virtual camera so as to include the avatar of the user, and thereby generates video data that represents the avatar and objects included in the virtual space by a three-dimensional model, and transmits the video data to the user device 10a of the user A. The user device 10a can create a video including the avatar of the user A by rendering the received video data, and display the video on a display of the user device 10a. The user A can move the avatar in the virtual space by manipulating the avatar, while watching the video of the virtual space displayed on the display. The avatar of another user may be placed in the virtual space.

In the virtual space, the virtual camera may be placed at a position away from the avatar of the user. In this case, the virtual camera can capture the visual field range in the virtual space including the avatar with a predetermined angle of view from a position away from the avatar. In this case, the virtual camera can capture the avatar of the user from a third-person perspective. When the avatar moves in the virtual space, the virtual camera may be moved so as to follow the avatar while maintaining the distance and angle of view of the avatar at constant levels.

The virtual camera may be placed at the same position as that of the avatar of the user placed in the virtual space, and may capture the visual field range in the virtual space from the position. In this case, the visual field range in the virtual space is captured by the virtual camera from a viewpoint (in other words, a first-person perspective) of the avatar of the user.

The virtual camera may be set so that image capture from a third-person perspective and image capture from a first-person perspective are switchable. The image capture from a third-person perspective and the image capture from a first-person perspective may be switched according to a user's operation input via the user terminal.

The position of the virtual camera in the virtual space may be changed according to a user's operation input via the user terminal. Settings other than the position of the virtual camera, for example, the gaze position, the gaze direction and/or the angle of view may be changed according to a user's operation input via the user terminal.

The server 20 can stream video data of a virtual space to the user device of each user participating in the virtual space. Each user can manipulate its own avatar while watching the image of the virtual space displayed on the user device. A user can interact with another user through an avatar in the virtual space. In the virtual space, a user can utilize various functions provided by the virtual space, such as purchase of an item, play of a mini-game, participation in an event, and functions other than those mentioned above.

The virtual space provided by the server 20 may be a metaverse space. A plurality of users can participate in a metaverse space through its own avatar at the same time. In the present disclosure, "virtual space" also includes "metaverse space". In a metaverse space, interaction between users, a work participated by a plurality of users, a play joined by a plurality of users, and a social activity in the real world other than those mentioned above are virtually reproduced. A user can participate in a metaverse space through its own avatar. The world of metaverse space may be defined by a three-dimensional global coordinate system. The avatars of users can walk freely in the world of metaverse space, and can communicate with each other.

The video processing system 1 may be configured so that one avatar (character object) among a plurality of avatars in the virtual space can stream a video as the character object of the streaming user. In other words, the video processing system 1 may be configured so that one-to-many video streaming can be performed in many-to-many metaverse virtual space. In such a space, it may be assumed that the streaming user and the viewing users are not particularly distinguished.

A three-dimensional world may not be defined in the virtual space provided by the server 20. The server 20 may provide a home space to users, the home space being a type of virtual space in which a three-dimensional world is not defined. The avatar of a user may be placed in a home space along with the objects (e.g., objects forming the background, an object gifted by another user) placed in the home space.

The server 20 may provide both a virtual space in which a world coordinate system is set, and a home space in which a world coordinate system is not set. A user may be able to utilize both a virtual space in which a world coordinate system is set, and a home space in which a world coordinate system is not set.

The server 20 may provide an editor function for a user to construct a virtual space (world) by combining objects. A user may transmit virtual space definition data that defines the created virtual space to the server 20. The server may store the user ID of a user who has created the virtual space along with the virtual space definition data that defines the virtual space. The virtual space created by a user may be available to other users.

1-2. Streaming and Viewing of Video

When utilizing a virtual space using an avatar, a user can stream a video including the visual field range (view) specified by a virtual camera in the virtual space to other users through the server 20. When user A starts to stream a video using a virtual space, the server 20 may create a room corresponding to the streaming. Other users can view the video of the user A by accessing the room. In this manner, a user of the video processing system 1 can stream a video obtained by capturing a virtual space with a virtual camera, or can view a video streamed by another user. When a virtual space is not utilized, a streaming user may be able to start to stream a video. When streaming of a video starts while a virtual space is not being utilized by a streaming user, a video of the virtual space may be created by placing an avatar in the virtual space and capturing the virtual space where the avatar is placed, then the video may be streamed. When streaming of a video starts while a virtual space is not being utilized by a streaming user, the avatar of the streaming user may be placed in a virtual space selected by the streaming user from available virtual spaces, or may be placed in the home space of the streaming user.

In the present disclosure, a user who creates and streams a video through the server 20 may be referred to as a "streaming user", and a user who views the video streamed by the server 20 may be referred to as a "viewing user". The distinction between a streaming user and a viewing user is not fixed. A user who streams a video is a streaming user while streaming the video, but is a viewing user while viewing a video streamed from another user. While a user utilizes the virtual space provided by the server 20 without streaming nor viewing a video (for example, while interacting with other users via an avatar), the user is neither a streaming user nor a viewing user. Like this, a specific user is not fixedly determined as a streaming user, and a user who streams a video among the users participating in the virtual space temporarily becomes a streaming user while streaming the video, and a user who views a streamed video among the users participating in the virtual space temporarily becomes a viewing user.

A streaming user may stream a video by oneself, or may stream a video along with other users. When a streaming user streams a video along with other users, the avatars of other users may be placed in the virtual space. When a streaming user streams a video along with other users, the video for streaming may be created by capturing a visual field range with a virtual camera, the visual field range including the avatar of the streaming user and the avatars of other users in the virtual space. An event is held which is participated by a plurality of users in the virtual space, and a video created by capturing the event may be streamed from the server 20. A streaming user may be a promoter of such an event participated by a plurality of users. In other words, a sponsor user (may be called an organizer user, a host user) who sponsors an event participated by a plurality of users in a virtual space can be interpreted as a streaming user. The event participated by a plurality of users in a virtual space includes a video chat, a voice chat, and a virtual event (such as a concert, a meeting, a party) in a virtual space.

A streaming user shall mean a user who transmits information related to image and/or sound. For example, a streaming user may be a user who performs video streaming by oneself, or who sponsors or organizes collaboration streaming participable by several users, a video chat or a voice chat participable and/or viewable by several users, and an event (such as a party) in a virtual space participable and/or viewable by several users, in other words, a streaming user may be a user who mainly performs these. Thus, a streaming user in the present disclosure may be reworded as a host user, a sponsor user or an organizer user.

A viewing user is able to not only view a video, but also provide reaction to the video. A viewing user may be a guest user (a user other than a sponsor user) who joins an event participated by a plurality of users in a virtual space. A viewing user may be called a supporting user because the viewing user can support a streaming user by sending a comment or a gift to the streaming user.

A viewing user shall mean a user who receives information related to image and/or sound. However, a viewing user may be a user who is able to not only receive the above-mentioned information, but also react to the information. For example, a viewing user may be a user who views video streaming, collaboration streaming, or a user who participates in and/or views a video chat, a voice chat or an event. Thus, a viewing user in the present disclosure may be reworded as a guest user, a participating user, a listener, a viewing user, or a supporting user.

A video of the virtual space captured by a virtual camera of a streaming user may be displayed on the user terminal of a viewing user. The avatar of a viewer user may not be placed in the virtual space where the avatar of the streaming user is placed. The avatar of a viewer user does not need to be included in a video displayed on the user terminal of the viewing user.

The avatar of a viewing user may be placed in a virtual space so that the avatar is movable in the virtual space. In this case, on the terminal of a viewing user, a video showing a visual field range in the virtual space rather than a video rendered in the user terminal of a streaming user may be displayed, the visual field range being captured by a virtual camera associated with the viewing user. Sound streamed by a streaming user may be reproduced along with a video showing a visual field range in the virtual space captured by a virtual camera associated with the viewing user.

1-3. Generation of Video

In the video processing system 1, capturing a virtual space by a virtual camera may generate three-dimensional model data representing a three-dimensional model for a visual field range in the virtual space captured in accordance with setting information of the virtual camera. The three-dimensional model data may include the setting information (e.g., the position, gaze position, gaze direction, magnification, and angle of view of the virtual camera in the virtual space) of the virtual camera, light source data indicating the position and quantity of light of a light source, a depth map, a normal map, and information necessary to generate a three-dimensional model for a visual field range in the virtual space captured by a virtual camera, other than the above-mentioned information. In the present disclosure, data representing a three-dimensional model for a visual field range in a virtual space is referred to as "video data", the visual field range being generated by capturing a virtual space with a virtual camera. A two-dimensional video (or a two-dimensional video frame) displayable on a monitor (display) is generated by rendering, with a rendering engine, video data representing a three-dimensional model.

In the video processing system 1, video data generated in the user device 10 of a streaming user may be streamed to the user devices of other users via the server 20. The user device 10 may transmit a video (video frame) instead of the video data to the server 20, the video being generated by rendering the video data, and the video may be streamed from the server 20. In this manner, the user device 10 of a streaming user may stream three-dimensional video data generated by capturing the virtual space with a virtual camera, or may stream a two-dimensional video (video frame) generated by rendering the video data.

A video created by a user may be streamed in real time. A video created by a user may be stored in a storage (e.g., a storage 25 of the server 20), and may be streamed on demand in response to a request from a viewing user. A video streamed in real time may be archived in the server 20

1-4. Rendering

A rendering process of converting video data to a two-dimensional video by rendering the video data may be performed by any device included in the video processing system 1. In an aspect, rendering of video data may be performed by the user device 10 of a viewing user. A method of generating a two-dimensional video by rendering video data in the user device 10 of a viewing user may be referred to as a "client rendering method" in the present disclosure. The video processing system 1 can adopt the client rendering method. In the client rendering method, before a video is generated, the user device 10 may obtain a rendering engine from an application streaming platform, for example. Before a video replay process is started, the user device 10 may hold avatar display data to represent the appearance of the avatar. In the client rendering method, the user device 10 receives, from the server 20, object data, identification information (avatar ID) of the avatar, motion data to represent the movement of the avatar, sound data, and information necessary for rendering as needed, other than the above-mentioned information, and can generate a two-dimensional video by rendering video data and display the generated video on a display based on the information received from the server 20 and pre-stored information.

In another aspect, rendering of video data may be performed by the user device 10 of a viewing user obtaining a web page from the server 20 and executing a computer program (e.g., a JAVA script) included in the web page by a browser included in the user device 10. On the web page, the storage location of data (e.g., object data, avatar display data, motion data) necessary to generate a video may be written. For example, the JAVA script included in the web page can obtain various data from the storage location of data written in the web page to generate a two-dimensional video based on the obtained data. A browser is software to view web pages written in HTML, and is different from a rendering engine. The browser can be used to view web pages provided by various servers in addition to web pages obtained from the server 20. In the present disclosure, a method of generating a two-dimensional video by rendering video data with the browser may be referred to as a "browser rendering method". The video processing system 1 can adopt a browser rendering method.

In still another aspect, rendering of video data may be performed by the server 20. When rendering is performed by the server 20, a two-dimensional video generated by rendering in the server 20 is transmitted from the server 20 to the user device 10. The user device 10 replays (displays) the video received from the server 20. A method of rendering video data by the server 20 may be referred to as a "server rendering method" in the present disclosure. In the server rendering method, a video generated by the server 20 is transmitted to the user device 10.

In still another aspect, rendering of video data may be performed by the user device 10 of a streaming user. In this case, a two-dimensional video is generated by rendering video data in the user device 10 of a streaming user, and the generated video is streamed to the user device 10 of a viewing user through the server 20. A method of rendering video data by the user device 10 of a streaming user may be referred to as an "image streaming method" in the present disclosure.

As described above, the video processing system 1 can adopt any of the client rendering method, the browser rendering method, the server rendering method, and the image streaming method. Thus, transmitting "video data" from the server 20 to the user device 10 includes transmission of a "video" generated from video data by the server 20. For example, when the video processing system 1 adopts the client rendering method, video data before rendering is transmitted from the server 20 to the user device 10, whereas when the video processing system 1 adopts the server rendering method, a two-dimensional video obtained by rendering video data is transmitted frame by frame from the server 20 to the user device 10. In other words, the "video data" transmitted from the server 20 to the user device 10 in the present disclosure may be video data before rendering or a video after rendering. The "video data" transmitted from user device 10 to the server 20 also may be video data before rendering or a video after rendering.

2. Format Video Associated with Format Data

As described above, in the user device 10, video data is generated by capturing the visual field range in a virtual space with a virtual camera. In the video processing system 1, video data generated by capturing a virtual space or a video generated by rendering the video data can be associated with one or a plurality of pieces of format data. In the present disclosure, a video or video data associated with one or a plurality of pieces of format data may be referred to as a "format video".

In the present disclosure, "three-dimensional video data" and a "two-dimensional video" generated by rendering the video data each may be referred to as a "video" unless distinction between three-dimensional video data and two-dimensional video is necessary. In the present disclosure, a "video" may indicate either video data before rendering or a two-dimensional video generated by rendering video data unless the "video" should be interpreted as either one of them contextually. According to this usage, format data is associated with a video generated by capturing a virtual space. The format data may be stored as metadata of a video in association with the video.

When video data is generated by capturing a visual field range in a virtual space with a virtual camera, a format used to create the video data can be generated as the format data for the video data. The format data for a format video can represent the format to be utilized at the time of image capture and/or at the time of replay of the format video. The format data for a video generated by capturing a virtual space includes, for example: virtual space identification information to identify the virtual space to be captured; coordinate information indicating the position in a virtual space where an avatar is placed at the time of image capture; movement information indicating coordinates in time series corresponding to the position of an avatar that moves in a virtual space; avatar direction information indicating the direction in which an avatar faces at the time of image capture; area identification information to identify a predetermined area (e.g., a specific building present in a virtual space, an open space in a virtual space, an event space in a virtual space, and areas other than those) in a virtual space; virtual camera setting information indicating the settings (e.g., the position, gaze position, gaze direction, magnification, and angle of view of the virtual camera in the virtual space) of a virtual camera to identify the camera work of the virtual camera at the time of image capture; motion information to identify the motion of an avatar at the time of image capture; object information to identify the objects (sets or coordinates of a single object or a plurality of objects) placed in the visual field range of a virtual camera at the time of image capture; musical piece information to identify the musical piece to be replayed in synchronization with the video; effect information to identify the effect displayed along with the video: filter information to identify a filter (e.g., blur) to be applied to the video; and insertion data information to identify the text or graphics inserted in the video. The format data for a format video may be determined by the user device of the user who creates the format video. When the format video is transmitted to the server 20, the format data associated with the format video may be transmitted from the user device 10 which has created the format video to the server 20 along with the format video or in association with the format video. The user device of a viewing user may obtain the format data associated with the format video along with the format video to be viewed.

Figure 2:
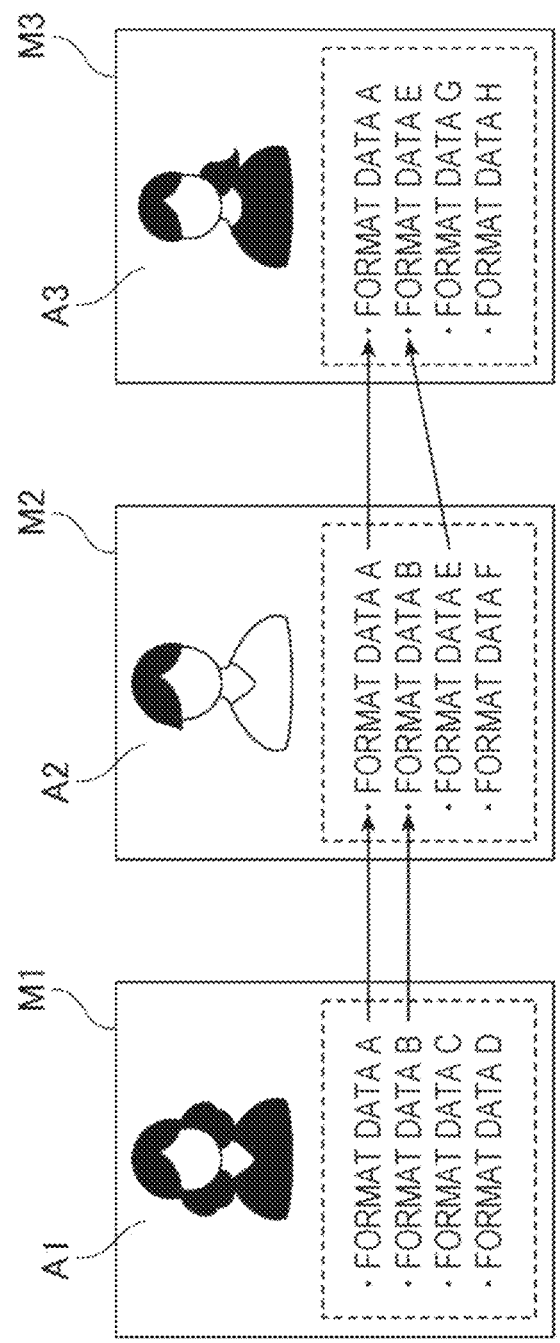
FIG. 2 is a chart schematically illustrating format data to be applied to a video streamed by the video processing system.

The format data associated with the format video may be utilized when another user creates a format video. Referring to FIG. 2, the generation of the format video utilizing format data will be described. Video M1, video M2, video M3 illustrated in FIG. 2 are the format videos created by a first user, a second user, and a third user, respectively. The video M2 is generated by utilizing part of a plurality of pieces of format data associated with the video M1, and the video M3 is generated by utilizing part of a plurality of pieces of format data associated with the video M2. Each of the videos M1 to M3 may be stored in the server 20 so as to be viewable by other users. Since FIG. 2 is referenced to describe the utilization of format data illustration of the elements, such as objects, constituting a virtual space is largely omitted in the videos M1 to M3 in FIG. 2. Hereinafter, from the generation of the video M1 to the generation of the video M3 will be described in order.

The video M1 is generated by capturing, with a virtual camera, the visual field range in the virtual space where avatar A1 of the first user is placed. The video M1 is associated with format data A to D. For example, the format data A is coordinate information indicating the position of the avatar A1 in the virtual space at the time of image capture of the video M1, the format data B is motion information to identify the movement of the avatar A1 at the time of image capture, the format data C is virtual camera setting information to identify the camera work of a virtual camera at the time of image capture, and the format data D is musical piece information indicating the musical piece to be replayed along with the video M1.

The format data A to D are displayed selectably by a viewing user on the user device of the viewing user who views the video M1. The second user who views the video M1 can create its own video M2 by using, as the formats, one or multiple of the format data A to D associated with the video M1. For example, when the second user selects the format data A to start to generate a video, avatar A2 of the second user is placed at the same position as the position where the avatar A1 is placed in the video M1 in the same virtual space as the virtual space where the avatar A1 is placed in the video M1. A video in the visual field range in the virtual space where the avatar A2 is placed is generated. In this manner, the second user selects the format data A associated with the video M1, thereby making it possible to start to capture the video M2 by placing its own avatar A2 at the same position as the position where the avatar A1 is placed in the video M1. In other words, the second user selects the format data A associated with the video M1 created by the first user, thereby making it possible to create its own video M2 using the format defined by the format data A. In order to place the avatar A2 at the same position as the position of the avatar A1 in the video M1 and generate a video of the virtual space where the avatar A2 is placed without utilizing the format data A, the second user needs to identify the virtual space where the avatar A1 is placed from the metadata set in the video M1, to cause the avatar A2 to appear in the virtual space, and to locate the point where the avatar A1 has been placed in the video M1 by moving the avatar A2 in the virtual space. Since the format data A provides the coordinate information indicating the position of the avatar A1 in the virtual space at the time of capturing the video M1, selecting the format data A associated with the video M1 makes it possible for the second user to place the avatar A2 at the same position as that of the avatar A1, and generate a format video including the avatar A2 placed at the position, eliminating the time and effort to locate the capture point in the virtual space.

Similarly, the second user selects the format data B to start to create a video, thereby making it possible to create a video in the virtual space including its own avatar A2 that performs the same motion as the avatar A1 in the video M1. In other words, when the second user selects the format data B to start to create the video M2, the motion of the avatar A2 of the second user in the video M2 can be made same as the motion of the avatar A1 in the video M1 by utilizing the motion information to identify the movement of the avatar A1.

In this manner, the second user who views the video M1 created by the first user can select favorite format data from a plurality of pieces of format data associated with the video M1, and create the video M2 using the selected format data. Selecting favorite format data from the pieces of format data associated with the video M1 of the first user, and generating the video M2 utilizing the format data makes it possible for the second user to create the video M2 in accordance with a desired format more easily in a shorter time. In addition, the second user does not reproduce all formats applied to the video M1, but only selects format data indicating a favorite format among the formats set in the video M1, and can create the video M2 utilizing the selected format data, thus the second user can show its own creativity at the time of creation of the video M2 rather than reproducing the format of an existing video.

In the example of FIG. 2, in order to create the video M2, between the format data A to D associated with the video M1, the format data A, B are selected, but the format data C, D are not selected. Thus, at the time of image capture of the virtual space to create the video M2, the camera work of a virtual camera indicated by the format data C is not utilized. At the time of replay of the video M2, a musical piece corresponding to the musical piece information indicated by the format data D is not replayed. Thus, the second user can create the video M2 by setting the camera work of a virtual camera to capture the avatar A2 by oneself, and capturing the avatar A2 in accordance with the camera work. In addition, the second user can select a musical piece by oneself to be replayed along with the video M2. In this manner, in respect of the placement and motion of the avatar A2, the second user can easily create the video M2 by utilizing the format data set in the video M1, and in respect of the identification of a camera work and the selection of a musical piece, the second user can show its own individual character and originality.

When the format of the video M2 is uniquely defined by the second user, format data indicating the format uniquely defined by the second user may be associated with the video M2. In the example illustrated in FIG. 2, virtual camera setting information to identify the camera work of a virtual camera determined by the second user at the time of capturing the video M2 is associated with the video M2 as format data E, and musical piece information selected by the second user is associated with the video M2 as format data F.

When the format data indicating the format uniquely defined by the second user is associated with the video M2, the format data associated with the video M2 of the second user includes taken-over format data (the format data A. B in the example of FIG. 2) which is taken over from the video M1, and the original format data (the format data E, F in the example of FIG. 2) uniquely defined by the second user at the time of capturing the video M2.

The format data associated with the video M2 generated in the above-described manner is further available by other users. In the example illustrated in FIG. 2, it is assumed that the video M2 is viewed by the third user. The third user can create the video M3 using one or multiple of the format data A and B, E and F associated with the video M2. In the example of FIG. 2, the video M3 is created by utilizing the format data A, E between a plurality of pieces of format data associated with the video M2. The format data G, H correspond to the format uniquely defined by the third user. In other words, between the pieces of format data associated with the video M3, the format data A, E are the format data that are taken over from the video M2, and the format data G, H are original format data indicating the format uniquely defined by the third user. Between the pieces of taken-over format data, the format data A is taken over from the video M1 to the second generation. The format data E is taken over from the video M2 to the only first generation.

In the example illustrated in FIG. 2, the format data for the video M1 is utilized by the second user, and the format data for the video M2 is utilized by the third user; however, the format data for the video M1 and the format data for the video M2 may be utilized by two or more users. The first user of the video M1 may utilize the format data which is not utilized in the video M1 among the format data for the video M2 generated by utilizing the format data for the video M2.

The server 20 can manage format videos, and format data associated with the videos. In addition, the server 20 can store user ID to identify the user who has uniquely created the format data in association with the format data. In addition, the server 20 can structurally store a utilization relationship between format data to be able to recognize the taken-over relationship between format data.

In the example illustrated in FIG. 2, for the sake of simplification of description, only three users appear, thus taken-over of the format data is described up to the second generation, but the format data may be taken over to the third generation or more.

The details of the generation and management of format data, and the generation of a format video using the format data will be further described below along with the configuration and function of the user device 10 and the server 20.

3. User Device 10 (User Device 10a)

3-1. Configuration of User Device 10

Next, the user device 10a will be described with further reference to FIG. 3. In the following, for the sake of simplicity of description, the user device 10a will be described; however, the description of the user device 10a also applies to the user device 10b, the user device 10c, and user devices other than those.

The user device 10a is an information processing device that can replay the video data or video transmitted from the server 20. More specifically, the user device 10a is a smartphone, a personal computer (PC), a mobile phone, a tablet terminal, a personal computer, an e-book reader, a wearable computer, a console for game, a head mount display, or various information processing devices other than those.

The user device 10a includes a processor 11, a memory 12, a user interface 13, a communication interface 14, and a storage 15.

The processor 11 is an arithmetic unit that loads an operating system or other various programs from the storage 15 or another storage into the memory 12, and executes the commands contained in the loaded program. The processor 11 is e.g., a CPU, an MPU, a DSP, a GPU, one of various arithmetic units other than those, or a combination of those. The processor 11 may be implemented by an integrated circuit such as an ASIC, a PLD, an FPGA, or an MCU. Additionally, processor 11 is processing circuitry or circuitry including transistors and other circuitry therein. Processor 11 may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor, such as processor 11, which may be considered a type of circuitry, the circuitry, means, or units are a combination of hardware and software, the software being used to configure the hardware and/or processor.

The memory 12 is used to store the commands executed by the processor 11 and various data other than those. The memory 12 is the main storage (main memory) quickly accessible by the processor 11. The memory 12 is comprised of a RAM such as a DRAM or a SRAM.

The user interface 13 includes an input interface that receives an input of a user, and an output interface that outputs various information by the control of the processor 11. The input interface is a pointing device such as a keyboard, and a mouse, a touch panel, or any information input device other than those mentioned above configured to receive an input of a user. The output interface is e.g., a liquid crystal display, an organic EL (Electro-Luminescent) display, a display panel, or any information output device other than those mentioned above configured to output a calculation result of the processor 11.

The communication interface 14 is implemented as hardware, firmware, or a communication software such as a TCP/IP driver and a PPP driver, or a combination of those. The user device 10a can transmit and receive data to and from another information device including the server 20 via the communication interface 14.

The storage 15 is an external storage device accessed by the processor 11. The storage 15 is e.g., a magnetic disk, an optical disk, a semiconductor memory, or various storage devices other than those mentioned above configured to store data. The storage 15 may store video processing application 15a to generate a video from received video data. The video processing application 15a may be downloaded from an application streaming platform to the user device 10a.

Figure 3:
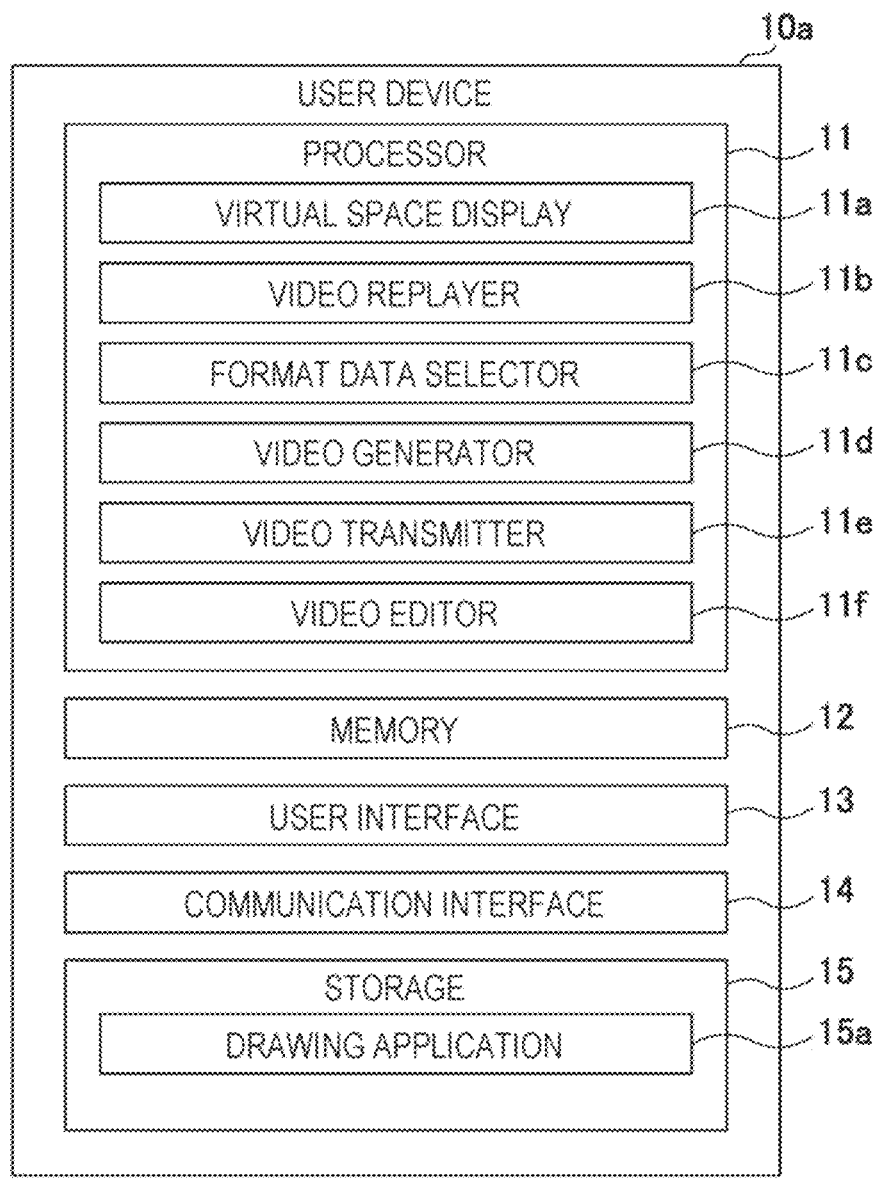
FIG. 3 is a block diagram illustrating a user device included in the video processing system.

The user device 10a may include hardware not specifically illustrated in FIG. 3. For example, the user device 10a may include a camera. The camera may be a 3D camera that can detect the depth of the face of a user to detect the feature points of the user's face.

3-2. Function of User Device 10a

The processor 11 of the user device 10a executes a command set contained in the video processing application 15a and another command set, thereby functioning as a virtual space display 11a, a video replayer 11b, a format data selector 11c, a video generator 11d, a video transmitter 11e, and a video editor 11f.

3-2-1. Virtual Space Display 11a

When the user A of the user device 10a starts to utilize the virtual space provided by the server 20, and places an avatar in the virtual space, the virtual space display 11a obtains, from the server 20, video data generated by capturing the virtual space with a virtual camera. The video data is three-dimensional data that represents, as a three-dimensional model, the avatar of the user of the user device 10a, the avatars of other users, objects in the virtual space, and/or components of the virtual space other than those mentioned above. When the video data is generated by capturing, from a third-person perspective, the visual field range in the virtual space including the avatar of the user device 10a, the virtual space display 11a can generate a video of the virtual space including the avatar of the user A by rendering the video data of the virtual space, and the video can be displayed on the display of the user device 10a. When the video data is generated by image capture based on a first-person perspective from the avatar of the user device 10a, the virtual space display 11a generates a video of the virtual space not including the avatar of the user A by rendering the video data of the virtual space, and can display the video on the display of the user device 10a.

Various objects may be placed in the virtual space. The objects placed in the virtual space include, for example: an object to represent natural landscape such as mountain, hill, river, forest; an object to represent a structure such as a building and a bridge; a piece of furniture installed indoors: an object to represent a gift presented to a user, and objects constituting the virtual space, other than those mentioned above. The video data processed by the virtual space display 11a includes objects placed in a visual field range among the objects placed in the virtual space, the visual field range being determined according to the setting information of a virtual camera.

3-2-2. Video Replayer 11b

As described above, a user who utilizes a virtual space using an avatar can stream, to other users, a video including the visual field range specified by a virtual camera in the virtual space. The video replayer 11b can replay a video streamed from another user via the server 20. For example, the video replayer 11b obtains a list of videos streamable from the server 20, and can replay a video selected from the list by the user A. The video replayer 11b receives, from the server 20, for example, the video data of a video selected by a user as a viewing target, and can generate a video by rendering the received video data. The images of the generated video are output to the display of the user device 10a, and sound and/or musical piece replayed along with the video are output to the speaker of the user device 10a. The user A can view the images output to the display, and the sound and musical piece output to the speaker. The video (sequence of video frames) after rendering may be streamed from the server 20 to the user device 10a. The video replayer 11b may replay a video by outputting the video frames received from the server 20 to the display.

The video replayer 11b obtains a list of viewable format videos from the server 20, and can replay a format video selected from the list by the user A. The format video may be transmitted from the server 20 to the user device 10a as the video frames after rendering. When obtaining the format video from the server 20, the video replayer 11b obtains format data associated with the format video.

3-2-3. Format Data Selector 11c

As described above, a format video is associated with format data representing the format of the format video. The format data selector 11e displays, on a display, for example, a format video selected by the user A as a viewing target or one or a plurality of pieces of format data associated with the format video being viewed by the user A in the user device 10a, and can select format data specified by the user A as selection format data from the displayed one or a plurality of pieces of format data.

As described above, the format data may be transmitted from the server 20 to the user device 10a along with the format video being viewed or in association with the format video data. For example, the format data may be set as metadata of the format video. In this case, the format data associated with the format video is transmitted from the server 20 to the user device 10a along with the format video.

For example, when a musical piece replayed in synchronization with the format video being viewed is selected as format data, the format data selector 11c identifies, as selection format data, the musical piece information to identify the selected musical piece. The format data selector 11c can identify, as selection format data, one or more of a plurality of pieces of format data associated with the format video being viewed. The format data selector 11c can identify, as selection format data, two or more of a plurality of pieces of format data associated with the format video being viewed. In addition to the musical piece information, the format data selector 11c can identify, as selection format data, the coordinate information to identify the position of an avatar in the virtual space, the avatar appearing in the format video being viewed.

3-2-4. Video Generator 11d

Next, the function of the video generator 11d will be described. The video generator 11d can generate video data that represents the visual field range in the virtual space captured by a virtual camera placed in the virtual space. As described below, the video data is streamed to other user devices through the server 20. When format data is selected by the format data selector 11c, the video generator 11d can generate a format video by utilizing the selection format data selected. When format data is not selected by the format data selector 11c, the video generator 11d can generate a format video without utilizing format data.

First, the generation of a video for streaming will be described. When streaming of a video starts by an operation of the user A, the video generator 11d starts to generate video data for streaming. For example, the video generator 11d adjusts the setting information of a virtual camera so that the visual field range in the virtual space to be captured by the virtual camera includes the avatar of the user A. The video generator 11d generates video data that represents the visual field range in the virtual space captured by the virtual camera.

While the virtual space is captured by the video generator 11d, the avatar of the user A is capable of making a predetermined motion in the virtual space, changing the facial expression in the virtual space, and moving in the virtual space based on instructions input to the user device 10a or detection information detected by the user device 10a. The video generator 11d can cause video data to include data representing change in the facial expression and the motion of the avatar so that change in the facial expression and the motion of the avatar can be reproduced by a rendering engine. For example, the video data can include avatar motion data to represent the change in the motion and the facial expression of the avatar. When the motion and the facial expression of the avatar in the virtual space are controlled based on the motion data which represents motion of the body and face of a user in time series, the motion being obtained by the user device 10a and another sensor, the motion data obtained by the user device 10a and the sensor may be avatar motion data. The sensor to obtain motion data may be a sensor to be worn by part of the body of a user.

Not only the avatar of the user A, but also the avatars of other users may be placed in the visual field range in the virtual space captured by the video generator 11d. In this case, the video generator 11d may generate video data so that the video data includes not only avatar motion data representing the change in the motion and the facial expression of the avatar of the user A, but also avatar motion data representing the change in the motion and the facial expression of the avatars of other users. The avatar motion data of other users may be transmitted from the server 20 to the user device 10a.

The visual field range in the virtual space captured by the video generator 11d may not include the avatar of the user A, and the avatars of other users may be placed in the visual field range. Thus, the user A can stream a video which does not include its own avatar, but includes the avatars of other users. The video generator 11d can capture the visual field range in the virtual space including the avatars of other users by adjusting the setting information of a virtual camera so that the visual field range includes the avatars of other users.

In the visual field range in the virtual space captured by the video generator 11d, not only is the avatar of the user present, but also a character (e.g., a non-player character whose action is controlled by a computer) who moves in the virtual space may present. The video generator 11d can generate video data so that a character included in the visual field range in the virtual space captured by a virtual camera is rendered by a rendering engine.

The visual field range in the virtual space captured by a virtual camera may include an object associated with the avatar of the user A. The objects associated with the avatar of the user A in the virtual space may include: an object to represent an avatar item (e.g., cloth, accessory) which is put on or worn by the avatar of the user A; an object to represent a vehicle on which the avatar of the user A rides: an object to represent a pet led by the avatar of the user A; and objects other than those mentioned above.

The video generator 11d can move the virtual camera in the virtual space, or change the settings of the virtual camera according to instructions input from a user via the user device 10a. The settings of the virtual camera may include the position, gaze position, gaze direction, magnification, and angle of view of the virtual camera in the virtual space. For example, the video generator 11d can move the virtual camera in the virtual space, or change the settings of the virtual camera according to instructions from a user so that the virtual camera implements: zoom capture to capture an enlarged image of the avatar of the user; panning capture to capture the periphery the avatar of the user by a virtual camera; perspective capture to capture the avatar of the user from a perspective position by a virtual camera; and camera work other than those mentioned above.

A plurality of virtual cameras may be installed in the virtual space. In this case, the video generator 11d may produce video data that indicates the visual field range in the virtual space captured by switching between a plurality of virtual cameras and using an activated virtual camera. For example, when virtual camera A and virtual camera B are installed in the virtual space, switching between the virtual camera A and the virtual camera B is possible. While the virtual camera A is selected and activated, video data showing the visual field range in the virtual space, as seen from the position of the virtual camera A may be generated, and while the virtual camera B is selected and activated, video data showing the visual field range in the virtual space, as seen from the position of the virtual camera B may be generated. The switching between the plurality of virtual cameras may be performed according to instructions of a user. The camera work of a virtual camera may be implemented by switching an active virtual camera between the plurality of virtual cameras installed in the virtual space.

As described above, the video generator 11d can generate video data for streaming by capturing the visual field range in the virtual space with a virtual camera.

Next, the generation of a format video will be described. When generation of a format video starts by an operation of the user A, the video generator 11d generates a format video by capturing the visual field range in the virtual space with a virtual camera. When selection format data is selected by the format data selector 11e, format images are generated by the video generator 11d utilizing the selection format data selected. The video generator 11d may store the generated format video in the storage 15 of the user device 10a, or may upload the generated format video to the server 20. The format video uploaded to the server 20 may be stored in the storage 25. The format video may be stored in a three-dimensional video data format, or in a two-dimensional video data format.

The video generator 11d can generate a format video in a similar manner to that for video for streaming except that the selection format data is available. For example, the video generator 11d may generate a format video so as to include change in the facial expression and the motion of the avatar. Alternatively, the video generator 11d may generate a format video so as to include the avatar of another user without including the avatar of the user A. The video generator 11d may generate a format video so as to include a character who moves in the virtual space and/or objects associated with the avatar of the user A. The video generator 11d may generate a format video by moving the virtual camera in the virtual space, changing the settings of the virtual camera, or switching the active virtual camera according to instructions input from a user via the user device 10a.

When format data is selected by the format data selector 11c, the video generator 11d can generate a video in the virtual space by utilizing selection format data selected by the format data selector 11c from various format data. Hereinafter, some examples of generation of a video utilizing selection format data will be described.

When virtual space identification information is selected by the format data selector 11c as selection format data, the video generator 11d generates video data by capturing, with a virtual camera, the visual field range in the virtual space identified by the selected virtual space identification information. For example, the avatar of the user A is placed in the virtual space identified by virtual space configuration information selected by the format data selector 11c, and video data may be generated by capturing the visual field range in the virtual space including the avatar with a virtual camera.

When coordinate information indicating the position where the avatar is placed in the virtual space at the time of image capture is selected as selection format data by the format data selector 11c, the video generator 11d can generate video data by placing the avatar of the user at the position in the virtual space identified by the coordinate information selected by the format data selector 11c, and capturing, with a virtual camera, the visual field range in the virtual space including the position where the avatar is placed.

When area identification information indicating the area where the avatar is placed in the virtual space at the time of image capture is selected as selection format data by the format data selector 11c, the video generator 11d can generate video data by placing the avatar of the user in a specific area in the virtual space identified by the area identification information selected by the format data selector 11c, and capturing, with a virtual camera, the visual field range in the virtual space including the position where the avatar is placed.

When movement information indicating coordinates in time series corresponding to the position of the avatar that moves in the virtual space is selected as selection format data by the format data selector 11c, the video generator 11d can generate video data by moving the avatar along the coordinates indicated in time series by the movement information selected by the format data selector 11c, and capturing, with a virtual camera, the visual field range in the virtual space including the avatar that is moving.

When avatar direction information indicating the direction in which the avatar faces at the time of image capture is selected as selection format data by the format data selector 11c, the video generator 11d places the avatar of the user in the virtual space so as to face in the direction indicated by the avatar direction information selected by the format data selector 11c. For example, when image capture from a first-person perspective is performed, the video generator 11d can generate video data by capturing, with a virtual camera, the visual field range in the virtual space seen in the direction indicated by the avatar direction information from a virtual camera placed at the position of the avatar.

When virtual camera setting information to identify the camera work of a virtual camera at the time of image capture is selected as selection format data by the format data selector 11c, the video generator 11d can generate video data by capturing the virtual space using the virtual camera settings identified by the selected virtual camera setting information. Thus, the virtual space can be captured by reproducing the camera work of a virtual camera in the virtual space, identified by the virtual camera setting information. For example, when the virtual camera setting information identifies the camera work corresponding to zoom image capture, the video generator 11d generates video data by capturing the visual field range in the virtual space using zoom capture. At the time of generation of video data, the video generator 11d can reproduce the camera work achieved by not only the zoom capture, but also panning capture, perspective capture, movement of the virtual camera, and switching between several virtual cameras. In other words, when virtual camera setting information is selected as selection format data, video data is generated so that the camera work identified by the virtual camera setting information is reproduced.

When motion information to identify the motion of an avatar at the time of image capture is selected as selection format data by the format data selector 11c, the video generator 11d can generate video data by controlling the movement of the avatar so that the avatar makes the motion identified by the selected motion information, and capturing, with a virtual camera, the visual field range in the virtual space including the avatar which makes the motion. The motion information can identify e.g., the choreography of dance. A motion identified by the motion information may continue only for a short time such as several seconds. For example, the motion information may be information to identify the choreography of dance for about 10 seconds. When motion information is selected as selection format data, video data is generated so that the movement of the avatar identified by the motion information is reproduced.

When object information to identify the object placed in the visual field range of a virtual camera at the time of image capture is selected as selection format data by the format data selector 11c, the video generator 11d can generate video data by placing the object identified by the selected object information in the visual field range of a virtual camera, and capturing the visual field range in the virtual space including the object with a virtual camera. When the object identified by the object information is an avatar item to be worn by an avatar, the video generator 11d can generate video data by causing the avatar to wear the avatar object identified by the object information, and capturing, with a virtual camera, the visual field range in the virtual space including the avatar which wears the object.

When musical piece information to identify a musical piece is selected as selection format data by the format data selector 11e, the video generator 11d sets the musical piece identified by the selected musical piece information as the musical piece to be replayed along with the video at the same time. At the time of replay of the video, the selected musical piece is replayed in synchronization with the images corresponding to the visual field range in the virtual space captured by a virtual camera.

When effect information to identify an effect to be displayed along with images is selected as selection format data by the format data selector 11c, the video generator 11d generates video data so as to include the selected effect information. At the time of rendering the video data, an effect corresponding to the effect information is displayed in synchronization with images corresponding to the visual field range in the virtual space captured by a virtual camera. For example, the effect may be an animation displayed in the background of the video. For example, the effect may be an animation of set off fireworks displayed in the background of the video.

When filter information to identify a filter to be applied to images is selected as selection format data by the format data selector 11c, the video generator 11d generates video data so as to include filter identification data that identifies the filter. At the time of rendering the video data, images are generated by applying the filter identified by filter identification data to the images corresponding to the visual field range in the virtual space captured by a virtual camera. The images generated by rendering may be blurred by applying the filter to the images.

When insertion data information to identify the text or graphics inserted in images is selected as selection format data by the format data selector 11c, the video generator 11d generates video data so as to include the selected insertion data information. At the time of rendering the video data, the text or graphics identified by the insertion data information are superimposed and displayed on the images corresponding to the visual field range in the virtual space captured by a virtual camera.

The video generator 11d can generate the format used to generate the format video data as format data for the video data. For example, the global coordinates of the avatar placed in the visual field range of a virtual camera at the time of image capture may serve as format data (coordinate information) to identify the position where the avatar is placed at the time of image capture. Information to identify an area in the virtual space included in the visual field range of a virtual camera at the time of image capture may serve as format data (area identification information) to identify the area where the avatar is placed at the time of image capture. When an avatar moves in the virtual space at the time of image capture, the coordinates in the virtual space, which are represented in time series so as to correspond to the movement of the avatar, may serve as format information (movement information) indicating the movement of the avatar. The direction in which an avatar placed in the visual field range of a virtual camera faces at the time of image capture may serve as format data (avatar direction information) indicating the direction in which the avatar faces at the time of image capture. When the video data includes avatar motion data that specifies the motion of an avatar, the avatar motion data may serve as format data (motion information)

to identify the motion of the avatar. Data which is generated from the avatar motion data and can identify the movement of an avatar may serve as the motion information. When the video data includes information on the virtual camera settings corresponding to camera work such as zoom capture, the information on the settings of the virtual camera may serve as format data (virtual camera setting information) to identify the camera work of the virtual camera used at the time of image capture. For example, the settings (e.g., the position, gaze position, gaze direction, magnification, and angle of view of the virtual camera) of the virtual camera at the time of image capture are recorded in time series, and the time-series recorded information indicating the settings of the virtual camera may serve as virtual camera setting information. The settings (e.g., the position, gaze position, gaze direction, magnification, and angle of view of the virtual camera) of the virtual camera, which are changed according to a series of motions and positional change of the avatar in the virtual space at the time of image capture, are recorded in time series, and the time-series recorded information indicating the settings of the virtual camera may serve as virtual camera setting information. For example, in image capture from a first-person perspective, when a virtual camera performs panning for an avatar who turns back, change in the gaze direction and angle of view of the virtual camera when the avatar turns back is recorded in time series, and the time-series recorded information indicating the settings of the virtual camera may serve as virtual camera setting information. When the visual field range in the virtual space captured by a virtual camera includes an object associated with an avatar, an object ID to identify the object may serve as format data (object information) to identify the object placed in the visual field range of the virtual camera at the time of image capture. The object information may include the local coordinates of an object contained in the visual field range in the virtual space captured by a virtual camera. The object information may identify the avatar item worn by an avatar included in the visual field range. As described above, when generating video data by capturing the visual field range in the virtual space with a virtual camera, the video generator 11d can set information indicating various formats used to generate the video data as the format data associated with the video data.

When a format video is generated by capturing the visual field range in the virtual space with a virtual camera, a virtual space ID to identify the virtual space may serve as format data (virtual space identification information) to identify the virtual space to be captured. The format data related to the format used at the time of image capture is not limited to what has been explicitly described in the present disclosure.

When a format image is generated by the format data selector 11e utilizing selection format data, the video generator 11d may use the utilized selection format data as the format data for the format image. As described below, format data may be assigned a format data ID that uniquely identifies the format data. When a format video is generated by the video generator 11d utilizing the selection format data, the format data may be associated with a format data ID assigned to the selection format data.

The format data generated by the video generator 11d may be transmitted to the server 20 by the later-described video transmitter 11e along with the format video or in association with the format video. For a format identified using the selection format data among the formats set in the format video, a format data ID assigned to the selection format data may serve as format data for the format. Thus, the format data associated with a format video may include a format data ID assigned to the selection format data utilized at the time of generating the format video, and format data (e.g., coordinate information, avatar motion data generated as described above) to identify a format newly generated at the time of generating the format video. In the present disclosure, format data to identify a format newly generated without utilizing selection format data at the time of generating a format video may be referred to as "original format data".

The video generator 11d can generate format data as metadata of video data. Thus, the video generator 11d can store format data associated with the video data along with the video data.

3-2-5. Video Transmitter 11e

Next, the function of the video transmitter 11e will be described. The video transmitter 11e can transmit a video for streaming or data of the video generated by the video generator 11d to the server 20. As described above, the server 20 which has received video data can transmit the video data to the user device 10a of a viewing user. The video data is rendered by the server 20 or the user device 10a of a viewing user, and a video based on the video data is generated. When the video processing system 1 adopts the image streaming method, the video transmitter 11e can transmit a video (a series of video frames constituting the video) generated by rendering the video data to the server 20. When format data is generated in association with the video data by the video generator 11d, the format data is transmitted to the server 20 in association with the video data, or along with the video data.

When a video generated by the video generator 11d is streamed in real time (live), the video transmitter 11e transmits video data to the server 20 in real time, the video data showing the video generated by the video generator 11d. The video generated by the video generator 11d may be transmitted to the server 20 at intervals after the generation of the video.

In addition, the video transmitter 11e can transmit the format video generated by the video generator 11d to the server 20. The format video may be transmitted to the server 20 along with the format data generated for the format video in the video generator 11d. The server 20 stores the received format video in the storage 25, for example. The server 20 may allow another user to view the format video received from the user device 10a, or disable another user to view the format video until instructions are received from the user A.

The video processing system 1 may have a first streaming mode in which the format video is streamed, and a second streaming mode in which a video other than the format video is streamed. In the first streaming mode, in addition to the format video, format data associated with the format video is transmitted to the user device of a user who views the format video. Thus, a user who views a format video can check the format data, or can create a new format video by utilizing the format data associated with the format video. In the second streaming mode, a video generated by the video generator 11d is streamed, but the format data is not streamed. In the present disclosure, a video streamed in the second streaming mode may be referred to as a "normal video". At the time of streaming a normal video, a format video associated with the normal video is not streamed.

3-2-6. Video Editor 11f

Next, the function of the video editor 11f will be described. The video editor 11f can edit a format video generated by the video generator 11d. For example, the video editor 11f can edit a video generated by the video generator 11*d* by changing the format data associated with the format video generated by the video generator 11*d*. Before making a format video viewable, the user A can replay the format video by its own user device 10*a* to be able to check the replayed format video and musical piece. At this time, altering the selection format data selected at the time of generating the format video to another format data can change the format video, and the musical piece replayed along with the format video. For example, when motion information A to identify the movement of an avatar is selected as format data to generate a format video, the video editor 11*f* can adopt motion information B as the format data instead of the motion information A based on the operation of the user A. Thus, the avatar performs the motion identified by the motion information A in the format video before being edited, whereas the avatar performs the motion identified by the motion information B in the format video after being edited. When the video editor 11*f* changes the association between the format video and the format data, the format data after the change can be stored in association with the format video. For example, when the motion information associated with the format video is changed from the motion information A to the motion information B, the motion information B is stored in association with the format data. As another example, when musical piece information to identify musical piece A is associated with the format video as the format data, musical piece information to identify another musical piece (e.g., musical piece B) selected by a user can be associated with the format video as new format data.

When the association between the format video and the format data is changed by the video editor 11*f*, the format data after the change is transmitted to the server 20 along with the format video. When a format video before being edited has been already transmitted to the server 20, the video editor 11*f* can transmit, to the server 20, an update request to cause the format data after the change to be associated with the format video.

After the format video is made viewable, the format data may be changed. Also in this case, the video editor 11*f* can transmit, to the server 20, an update request to change (or update) the format data to be associated with the format video. The server 20 can store the format video and the format data after the change in association with each other, and can transmit the format video after the change to the user device of a viewing user along with the format video. The video editor 11*f* may change any piece of the format data associated with the video data.

4. Server 20

4-1. Configuration of Server 20

Figure 4:
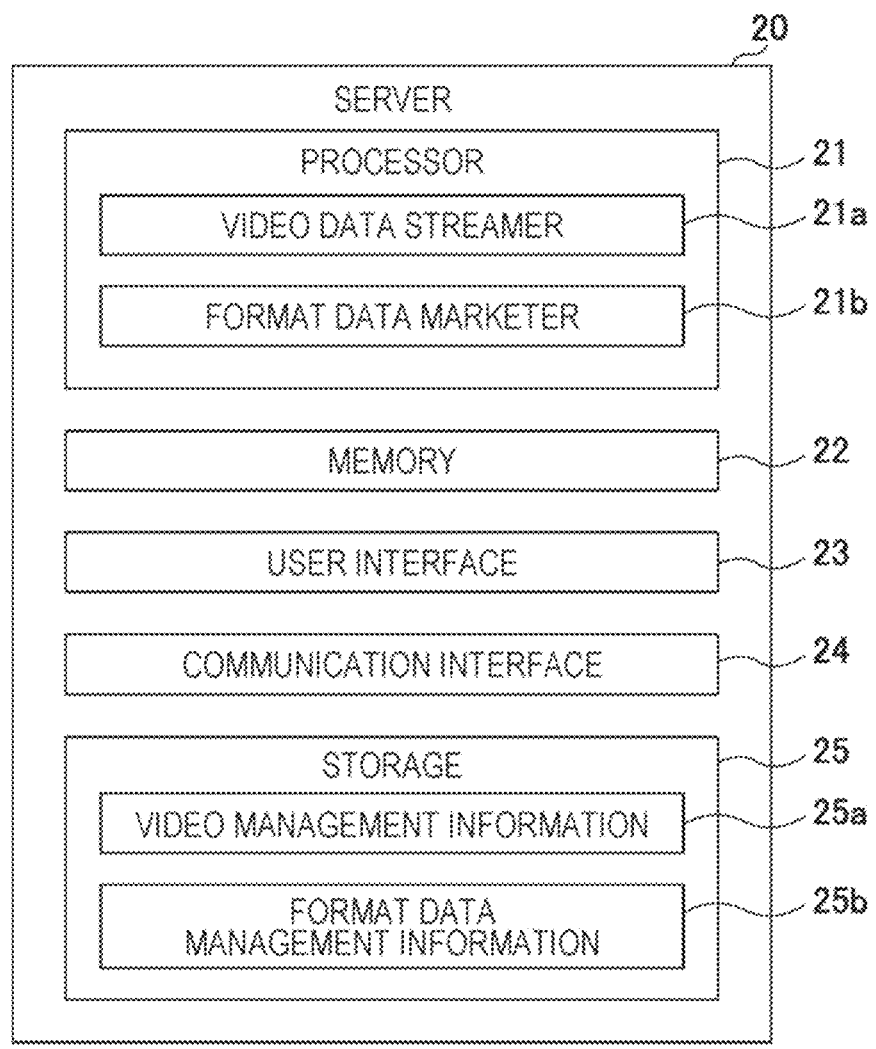
FIG. 4 is a block diagram illustrating a server included in the video processing system.

Next, the function of the server 20 and the data to be stored in the server 20 will be described with further reference to FIG. 4. The server 20 includes a processor 21, a memory 22, a user interface 23, a communication interface 24, and a storage 25. As with the processor 11, the processor 21 is one of various arithmetic units, such as a CPU. The memory 22 is the main storage (main memory) quickly accessible by the processor 21. The user interface 23 includes an input interface that receives an input of a user of the server 20, and an output interface that outputs various information by the control of the processor 21. As with the communication interface 14, the communication interface 24 is one of various drivers, software to communicate with another device, or a combination of those. As with the storage 15, the storage 25 is one of various storage devices configured to store data, such as a magnetic disk. The processor 21 loads an operating system or other various programs from the storage 25 or another storage into the memory, and executes the commands contained in the loaded program.

4-2. Data Stored in Storage 25

The storage 25 stores format video management information 25*a* and format data management information 25*b*. The storage 25 may store data other than those mentioned above.

4-2-1. Format Video Management Information 25*a*

Format video management information 25*a* will be described with reference to FIG. 5. The format video management information 25*a* is a data set in which data to manage format videos is structurally stored. The format video management information 25*a* includes, for each format video, creator user identification information to identify the user who has created the format video, the format video, and format data in association with format video identification information to identify the format video.

The video identification information for a format video is e.g., a video ID to identify the format video. In response to the reception of a format video by the server 20 from the user device 10, the video ID may be assigned to the format video. The video ID uniquely identifies the format video.

The creation user identification information for a format video is e.g., the user ID of a user who has created the format video. For example, when the user A creates a format video in the user device 10*a*, and transmits the format video to the server 20, the user ID of the user A is stored as the creator user identification information.

The format video information for a format video is e.g., video frames that constitute the format video. As described above, the format video generated in the user device 10*a* can be transmitted to the server 20 in the format of a two-dimensional video or video frame generated by rendering the video data. The format video or the video frame after the rendering may be stored in the format video management information 25*a* in association with the video ID to identify the format video. The format video information may include the video data (video data before the rendering) of the format video. The video data of the format video is e.g., a three-dimensional model data representing a three-dimensional model for the visual field range in the virtual space captured by a virtual camera. A two-dimensional video (video frame) is generated by rendering the video data with a rendering engine. The video data may include data other than the three-dimensional model data necessary for rendering. For example, the video data of a format video may include: object ID data (object ID) to identify each of one or a plurality of objects contained in the format video; avatar identification data to identify an avatar included in the format video; avatar motion data to identify the movement of an avatar included in the format video; and data necessary to generate format videos other than those mentioned above.

The format data for a format video is format data associated with the format video. As mentioned above, format data associated with the format video is transmitted from the user device 10 of a streaming user along with the format video or in association with the video data of the format video. When the server 20 receives format data along with the format video or in association with the format video, the received format data is stored in relation to the video ID of the format video. Specifically, the format data may include various data to define the format for video data, such as virtual space identification information, coordinate information, and avatar motion data. For the same data, and the format video, the video data and format data may be stored, respectively. For example, the avatar motion data may be included in both the video data and the format data.

4-2-2. Format Data Management Information 25b

Format data management information 25b will be described with reference to FIG. 6. The format data management information 25b is a data set in which data to manage format data associated with the format video is structurally stored. The format data management information 25b includes, for each format data associated with the format video, format data identification information to identify the format data, creator user identification information to identify the user who has created format information, and the format data.

The format data identification information for format data is e.g., a format data ID to identify the format data. In response to reception of format data by the server 20 from the user device 10 of a streaming user, a format data ID may be assigned to the format data. As mentioned above, the format data associated with the format video may include a format data ID assigned to selection format data utilized at the time of generating the format video, and format data (e.g., coordinate information, avatar motion data generated as described above) to identify a newly generated format at the time of generating the format video. When the server 20 receives a format video from the user device 10 of a streaming user, format data ID may be newly assigned to only original format data to identify a newly generated format at the time of generating the format video among pieces of format data associated with the format video.

The creator user identification information for format data is e.g., the user ID of a user who has (originally) created the format data for the first time. When the server 20 receives, from the user device 10, format data not labeled a format data ID associated with the format video, a format data ID is assigned to the format data, and the user ID of the user of the user device 10 is stored in association with the format data ID. Thus, the original format data can be uniquely identified by the format data ID, and the user who has created the original format data can be uniquely identified by the user ID associated with the format data ID.

As described above, when the server 20 receives the original format data associated with the format video, a format data ID is assigned to the original format data, thus the original format data is stored in the format data management information 25b in association with the format data ID (format data identification information). As already described, the original format data is various data representing the format generated without utilizing selection format data among format videos. The original format data may be, for example, at least one selected from a group consisting of virtual space identification information, coordinate information, area identification information, movement information, avatar direction information, virtual camera setting information, motion information, object information, effect information, filter information and insertion data information. Format data associated with the format data identification information may be tokenized as an NFT (non-fungible token) or an SFT (semi-fungible token). NFT conversion or SFT conversion of format data may be performed according to a request from a streaming user.

4-3. Function of Server 20

Next, the function performed by the processor 21 of the server 20 will be described. The processor 21 executes computer-readable commands contained in a program recorded in the storage 25, thereby functioning as a video data streamer 21a and a format data marketer 21b.

In the second streaming mode, in response to a streaming request from the user device of a viewing user, the video data streamer 21a can stream a normal video requested for streaming in the streaming request to the user device 10. The server 20 may transmit, to the user device 10, a streaming video list in which streamable normal videos are listed. A user of the user device 10 may select a normal video desired to be viewed from the streaming video list. The user device 10 can transmit a streaming request for the user-selected video to the server 20. The video data streamer 21a may stream the user-selected normal video to the user device 10 of the user. In this manner, in the second streaming mode, the normal video is viewable in the user device 10.

In streaming in the second streaming mode, the video data streamer 21a may stream the video data (three-dimensional model data) of a normal video to the user device 10 of a viewing user. In this case, a video (normal video) for replay may be generated by rendering the video data in the user device 10 of a viewing user. When the server rendering method or the image streaming method is adopted in the video processing system 1, the video data streamer 21a may transmit the normal video after rendering to the user device 10a.

In the first streaming mode, the video data streamer 21a may transmit, to the user device 10, a format video list in which format videos viewable by users are listed. The format video list may include the videos allowed by the creator user to be viewed by other users among the format videos stored in the format video management information 25a. The user of the user device 10 may select a format video desired to be viewed from the format video list. The video data streamer 21a may transmit the format video selected from the format video list by a user to the user device 10 of the user. The format video may be transmitted to the user device 10 along with format data associated with the format video. In this manner, in the first streaming mode, format video is viewable in the user device 10.

In streaming in the first streaming mode, the video data streamer 21a may transmit a format video after rendering to the user device 10 of a viewing user. In this case, the user device 10 of a viewing user can replay the format video by outputting the format video received from the server 20 to a display. Thus, in the first streaming mode, a video may be streamed in a format different from that of the second streaming mode. In the video processing system 1, the client rendering method may be adopted for rendering of format video. In this case, the video data (three-dimensional model data) of the format video is transmitted from the server 20 to the user device 10 of a viewing user, and in the user device 10, the video data is rendered to generate a format video.

In the service provided by the server 20, a user who has created original format data registered in the format data management information 25b can be granted the right to sell the original format data. The format data marketer 21b may create a sales target list including the original format data and the sale amount, and may release the list to users. For example, when receiving a sales request for the original format data from the user who has created the original format data, the format data marketer 21b can add the original format data to the sales target list. When receiving a purchase request from a user wishing to purchase the original format data included in the sales target list, the format data marketer 21b sells the original format data in the purchase request to the user. The format data marketer 21b may grant the right to use the original format data to another user with or without charge. The usage right may be exclusively granted to a user, or may be non-exclusively granted to a plurality of users.

When format data is converted to an NFT or SFT, the format data marketer 21*b* may provide a function as a market place for NFT and SFT. The format data converted to an NFT or SFT may be traded in a market place outside the video processing system 1.

5. Flow to Generate Format Video Utilizing Format Data

Next, a method of generating another format video utilizing format data associated with a format video streamed in the first streaming mode will be described with reference to FIG. 7. The process in each step described in FIG. 7 is executed by the processor 11. The processor 11 may execute the process illustrated in FIG. 7 in cooperation with other processors as necessary. In FIG. 7, it is assumed that a format video created by the user C and made viewable by other users is received by the user device 10*a* of the user A. For example, the format video list provided by the server 20 includes format video C created by the user C. The user A obtains the format video list including the format video C from the server 20, and selects the format video C from the format video list as the format video to be viewed. It is assumed that each format video created by the user C is associated with a plurality of pieces of format data. Even when the user A does not stream a normal video, the user A can create a format video by viewing the format videos of other users. When the user A does not stream a normal video, the avatar of the user A may not be placed in a specific virtual space: however, a format video can be captured by utilizing the home space of the user A. At the start of image capture of a format video, virtual spaces as candidates may be displayed on the user device 10*a* of the user A so that a virtual space used for image capture of a format video can be selected.

First, in step S11, the format video C created by the user C is transmitted from the server 20 to the user device 10*a* of the user A, and the format video C is received by the user device 10*a*.

The format video C received in step S11 is replayed in the user device 10*a*. For example, an image of the format video C is output to a display of the user device 10*a*, and sound and/or musical piece of the format video C is output to a speaker of the user device 10*a*. The format video C may be transmitted from the server 20 in a format of video data before rendering, not in a format of video or video frame. In this case, in step S12, the received video data is rendered by the user device 10*a*, and a format video generated by the rendering is replayed.

FIG. 8 illustrates an example of an image corresponding to a format video replayed in the user device 10*a*. An image 30 corresponding to the format video is displayed on the display of the user device 10*a*. In addition to an avatar 31 of the user C who has created the format video, objects 32, 33, 34, and 35 are placed on the image 30. A replay button 41 is displayed as an overlay on the image 30 displayed on the display. When the replay button 41 is selected, replay of the format video starts.

The format video received in step S11 is associated with one or more pieces of format data, thus, in step S11, the pieces of format data are obtained along with the format video. An icon 42 to utilize the format data associated with the format video received in step S11 is displayed as an overlay on the image 30 displayed on the display. The icon 42 is an example of a selection element to receive a selection from a user.

Figure 9:
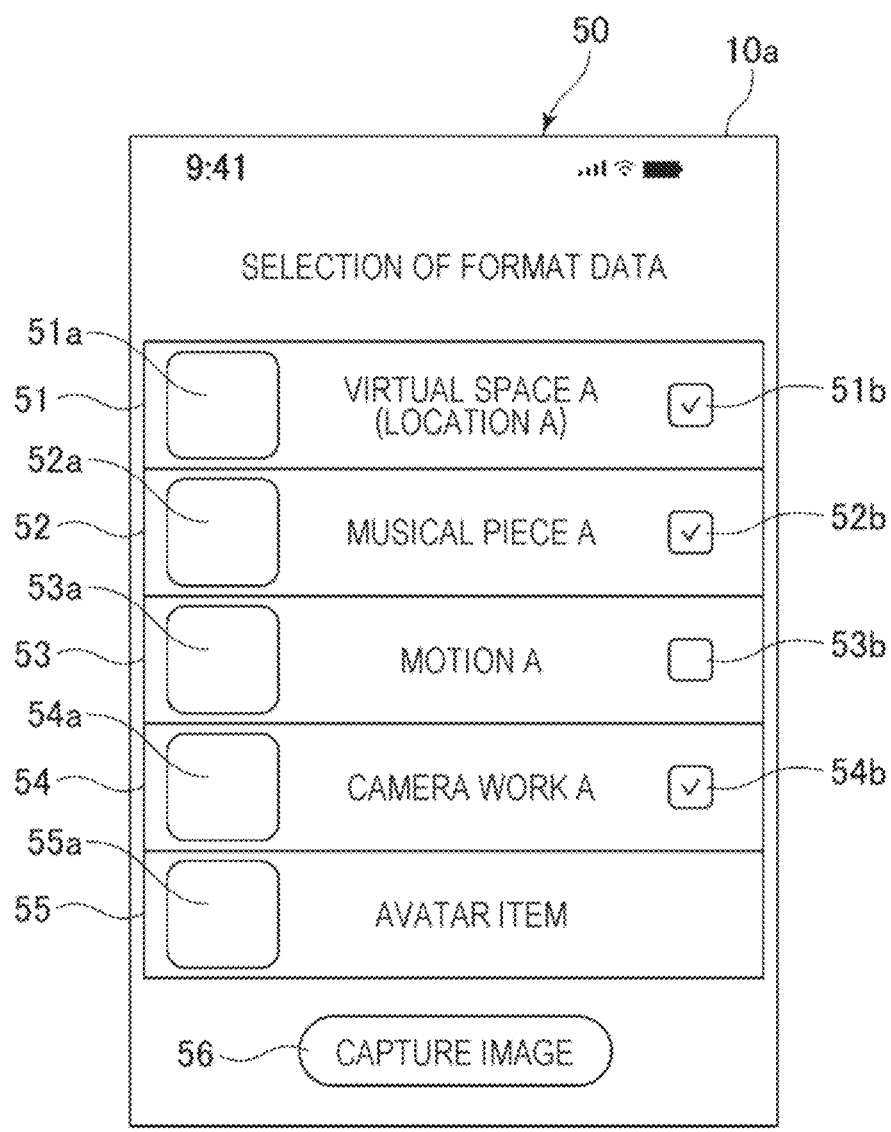
FIG. 9 is a view schematically illustrating a display example of a selection screen to select format data.

When the user A selects the icon 42, in step S13, a selection screen to select a piece of format data among the pieces of format data received along with the format video is displayed, the piece of format data being utilized at the time of generating a video of the user A. FIG. 9 is an example of a format data selection screen which is displayed on the display of the user device 10*a* by selecting the icon 42. As illustrated in FIG. 9, a format data selection screen 50 includes display elements corresponding to the pieces of format data obtained along with the format video. Specifically, the format data selection screen 50 includes: a display element 51 corresponding to virtual space identification information, a display element 52 corresponding to musical piece information, a display element 53 corresponding to motion information, a display element 54 corresponding to virtual camera setting information, and a display element 55 corresponding to object information. The format data selection screen 50 further includes an image capture button 56 to perform image capture to generate a new format video by the user A. The format data selection screen 50 illustrated in FIG. 9 is an example of a user interface to allow a user to select format data to be utilized to generate a format video. The user A may select format data to be used to generate a video by utilizing another user interface not through the format data selection screen 50.

The display element 51 includes: the name (virtual space A) of a virtual space identified by the virtual space identification information which is one of the pieces of format data associated with the received video data, the location (coordinates) of the avatar in the virtual space A, a thumbnail 51*a* of the virtual space A, and a check box 51*b* to select the virtual space A. When a format video is generated by utilizing virtual space identification information corresponding to a display element A, the arrangement of an avatar and the direction of an avatar in the virtual space which are identifiable by the virtual space identification information may be identified by the virtual space identification information, or may be identified by format data different from the virtual space identification information. When the arrangement of an avatar and the direction of an avatar in the virtual space are identified by format data different from the virtual space identification information, at the time of selection of utilization of the virtual space identification information, a display may be provided to promote selection of format data (e.g., coordinate information, avatar direction information and/or area identification information) to identify the arrangement of an avatar and the direction of an avatar in the virtual space. When the thumbnail 51*a* is selected, detailed information on the virtual space A may be displayed. The detailed information on the virtual space A may include: the producer of the virtual space A, the data volume, a list of format videos generated by utilizing the virtual space A so far, and information on the virtual space A other than those mentioned above. On the display element 51, the counter value to utilize the virtual space A may be displayed. The user A can utilize the virtual space A to create a format video by checking the check box 51*b*.

The display element 52 includes: the name (musical piece A) of a musical piece identified by musical piece information which is one of the pieces of format data associated with the received video data, an icon 52*a* of the musical piece A, and a check box 52*b* to select the musical piece A. When the icon 52*a* is selected, part of the musical piece A is output to the speaker of the user device 10*a*. Thus, the user A can listen to the musical piece A by selecting the icon 52*a*. When the icon 52*a* is selected, detailed information on the musical piece A may be displayed. The detailed information on the musical piece A may include: the artist name indicating the name of an artist who plays the musical piece A, the data volume, a list of videos generated by utilizing the musical piece A so far, and information on the musical piece A other than those mentioned above. On the display element 52, the counter value to utilize the musical piece A may be displayed. The user A can utilize the musical piece A to create a format video by checking the check box 52*b*.

The display element 53 includes: the name (motion A) of a motion identified by the motion information which is one of the pieces of format data associated with the received video data, a video display area 53*a*, and a check box 53*b* to select the motion A. On the video display area 53*a*, a video of an avatar is displayed, who performs a series of motions identified by the motion A. The user A can view the series of motions of the avatar identified by the motion A through the video displayed on the video display area 53*a*. The video display area 53*a* may be associated with detailed information on the motion A, and when the video display area 53*a* is selected, the detailed information on the motion A may be displayed. The detailed information on the motion A may include: the user name of the user who has generated the motion A, a list of videos generated by utilizing the motion A so far, and information on the motion A other than those mentioned above. The user name of the user who has generated the motion A can be obtained from the format data management information 25*b*. The user name of the user who has generated the motion A may be associated with the received video data, and transmitted from the server 20 to the user device 10*a*. On the display element 53, the counter value to utilize the motion A may be displayed. The user A can utilize the motion A to create a format video by checking the check box 53*b*. When a format video is generated by utilizing the motion A, in the generated format video, it is possible to cause the avatar of the user A to perform the same motion as the motion performed by the avatar 31 in the received format video.

The display element 54 includes: the name (camera work A) of a camera work identified by the virtual camera setting information which is one of the pieces of format data associated with the received video data, a video display area 54*a*, and a check box 54*b* to select the camera work A. On the video display area 54*a*, a video is displayed, which is generated by capturing a model avatar in accordance with the camera work identified by the camera work A. The model avatar is set up by the operator of the virtual space. The user A can understand the camera work identified by the camera work A through the video displayed on the video display area 54*a*. The video display area 54*a* may be associated with detailed information on the camera work A, and when the video display area 54*a* is selected, the detailed information on the camera work A may be displayed. The detailed information on the camera work A may include: the user name of the user who has generated the camera work A, a list of videos generated by utilizing the camera work A so far, and information on the camera work A other than those mentioned above. The user name of the user who has generated the camera work A can be obtained from the format data management information 25*b*. The user name of the user who has generated the camera work A may be associated with the received video data, and transmitted from the server 20 to the user device 10*a*. On the display element 54, the counter value to utilize the camera work A may be displayed. The user A can utilize the camera work A to create a format video by checking the check box 54*b*. When a video is generated by utilizing the camera work A, in the generated video, it is possible to capture the avatar of the user A with the same camera work as the camera work used to capture the avatar 31 in the format video data of the user C.

The display element 55 includes a selection button 55*a* to select an avatar item identified by the object information which is one of the pieces of format data associated with the received format video. In FIG. 9, a check box associated with an avatar item is not shown, but the display element 55 may be provided with a check box as in another format data. When the display element 55 is provided with a check box, and a user checks the check box, the avatar items worn by the avatar in the received format video of the user C may be worn by the avatar of the user A as they are, and a format video including the avatar of the user A wearing the avatar items may be generated. In other words, when the check box provided in the display element 55 is checked, the set (coordination) of avatar items worn by the avatar of the user C may be used as the set (coordination) of avatar items to be worn by the avatar of the user A.

Figure 10:
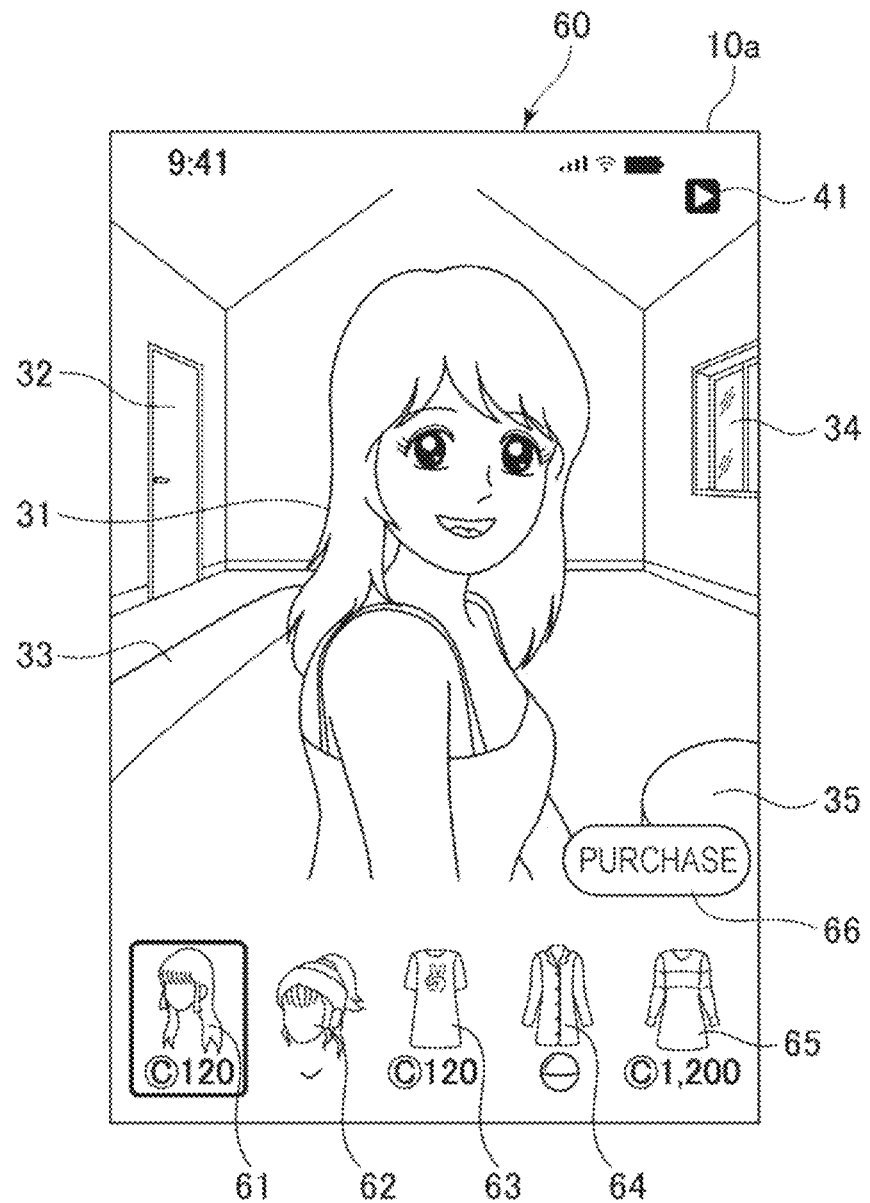
FIG. 10 is a view schematically illustrating an example of a screen displayed in a process of selecting an avatar item as format data.
Figure 11:
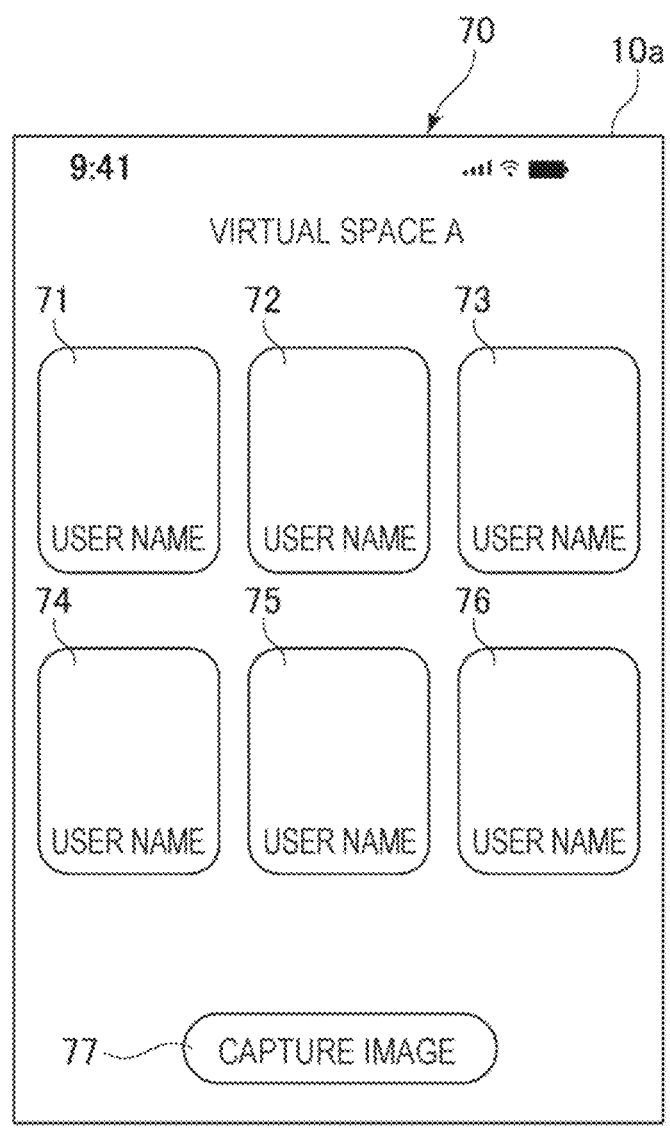
FIG. 11 is a view schematically illustrating a screen including a list of videos which utilize the same virtual space as that of a received video.

When the selection button 55*a* is selected, an item selection screen to select an avatar item is displayed on the display of the user device 10*a*. FIG. 10 illustrates an example of an item selection screen which is displayed in response to selection of the selection button 55*a*. On an item selection screen 60 illustrated in FIG. 10, avatar items 61 to 65 wearable by the avatar of the user A are shown. Only those avatar items worn by the avatar 31 included in the received format video may be displayed on the item selection screen 60. Of the avatar items 61 to 65, the avatar item 61 worn by the avatar 31 included in the received video data is surrounded by a frame border for emphasis. The user A can select the avatar item 61 or another avatar item. The avatar items displayed on the item selection screen 60 may be part of the avatar items selectable by the user A. Other avatar items may be displayed by scrolling the area where the avatar items 61 to 65 are displayed in a horizontal or vertical direction. When an avatar item is utilized in association with one of the avatar items 61 to 65, the counter value of the avatar item may be displayed. When one of the avatar items is selected, a purchase button 66 becomes selectable. When the purchase button 66 is selected, purchase of the selected avatar item is completed. The user A can cause the purchased avatar item to be worn by its own avatar.

In the example illustrated in FIG. 9, the check boxes 51*b*, 52*b*, 54*b* are checked. When the image capture button 56 is selected with the check boxes 51*b*, 52*b*, 54*b* checked, in step S14, a format video of the user A is generated by utilizing the virtual space A, the placement location of the avatar set in the virtual space A, the musical piece A, and the camera work A. Specifically, the avatar of the user A is placed at the placement location in the virtual space A, the musical piece A is specified as the musical piece at the time of replay, and video data is generated by capturing the visual field range in the virtual space determined in accordance with the camera work identified by the camera work A. The avatar of the user A placed in the virtual space A may wear the avatar item purchased on the item selection screen 60.

In the example illustrated in FIG. 9, the check box 53*b* is not selected, thus at the time of image capture in step S14, the avatar of the user A does not perform the motion identified by the motion A. The motion of the avatar of the user A may be controlled based on motion data obtained by the user device 10*a* or another sensor, the motion data representing the movement and facial expression of the body and face of the user A in time series. After selection of the image capture button 56, the motion data to identify the motion of the avatar of the user A may be obtained in real time at the time of generating a format video of the user A. In other words, after selection of the image capture button 56, the change in the motion and facial expression of the user A may be detected by the user device 10a or a sensor to obtain motion data according to the detected change in the motion and facial expression of the user A, and a format video of the user A may be generated using the obtained motion data. The avatar of the user A that performs in accordance with thus obtained motion data may be displayed on the user device 10a. Thus, the user A can change its own movement and facial expression while watching the movement of the avatar displayed on the user device 10a (while obtaining the movement of the avatar displayed on the user device 10a as feedback). The motion of the avatar of the user A is set uniquely by the user A, thus in step S14, at the time of generating video data (in other words, at the time of image capture by a virtual camera to generate video data), motion information (motion B) to identify the motion of the avatar of the user A is set as the format data (original format data created by the user A) associated with the format video created in step S14. In step S15 in the later stage, the motion information is uploaded to the server 20 along with the format video.

When the counter value of the format data selected by the user A is set, the counter value is charged to the user A in response to selection of the image capture button 56. For example, in the example of FIG. 9, the virtual space A is selected, thus due to selection of the image capture button 56, the counter value to utilize the virtual space A is charged to the user A. When the virtual space A is user generated content (UGC) generated by a user, part or all of the counter value of the virtual space A may be paid to the user who has created the virtual space A. Part or all of the counter value due to utilization of the motion A may be paid to the user who has created the motion A. In addition, part or all of the counter value due to utilization of the camera work A may be paid to the user who has created the camera work A. Payment of the counter value may be made by legal currency, crypto assets, coin or token in circulation only in the service provided by the server 20, or digital asset other than those mentioned above.

The format video generated in step S14 is stored in the storage in step S15. For example, the generated format video is uploaded to the server 20, and stored in the storage 15 of the server 20. The server 20 can store the received format video of the user A in the storage 25 as part of the format video management information 25a. The format video of the user A may be stored in a storage area in the storage 25, assigned to the user A. The user A may set disclosed state in which the format video uploaded to the server 20 is viewable by other users, or undisclosed state in which the format video is not viewable by other users. The server 20 may switch between disclosed state and undisclosed state according to a request from a user. The format video of the user A may be stored in the storage 15 of the user device 10a before being uploaded to the server 20. The user A can upload the format video stored in the storage 15 to the server 20 at a desired timing.

When the format video is set in disclosed state, the server 20 makes the format video viewable by other users. Specifically, when the format video is uploaded in disclosed state or the setting of the format video is changed from undisclosed state to disclosed state, the server 20 may add the format video to the format video list. In this case, when receiving a viewing request from a user terminal which has obtained the format video list, the server 20 can transmit the format video to the user device 10 which has made the viewing request.

The format video generated in step S14 may be displayed on the display of the user device 10a. The user A can check the format video by watching the video displayed on the display. The user A can determine whether the format video is edited by watching the video displayed on the display. For example, the user A can edit the format video by setting the effect to be applied to the format video. In addition, the user A can edit the format video by inserting text and graphics into the format video. Effect information to identify the effect set in the format video and insertion data information to identify the insertion data inserted into the video may be uploaded to the server 20 in association with the format video generated in step S14. Thus, when the format video is replayed in the user device of a viewing user, the effect identified by the effect information and the text and/or graphics identified by the insertion data information can be reflected on the format video.

The format corresponding to the format data selected in step S13 can be modified by editing the format after the format video is generated. For example, after the musical piece A is selected as the musical piece to be replayed along with the format video, selecting musical piece B different from the musical piece A can change the musical piece to be replayed along with the generated format video. The format data selected in step S13 other than the musical piece information can also be changed after the format video is generated The format video can be edited at any timing after the format video is generated. For example, the format may be edited (1) before the format video is uploaded to the server 20, (2) after the format video is uploaded to the server 20 and before disclosed state is set (in undisclosed state), or (3) after the format video is uploaded to the server 20 and undisclosed state is set.

As described above, the user A can create its own format video by combining the pieces of format data associated with the received format video. At this time, the user A does not need to reproduce all of the plurality of pieces of format data associated with the received format video, and can select and utilize a desired piece of format data from the plurality of pieces of format data to utilize for generation of its own format video. Thus, when the user A creates its own format video, for part (e.g., a musical piece) of the formats, format data associated with another format video (the format video created by the user C in the above-mentioned example) is utilized, whereas for the other (e.g., the motion of the avatar) of the formats, a format on which the individuality of the user A is reflected can be generated without utilizing the format of another format video, thus both simplicity and creativity of video generation can be achieved.

In addition, the user A can utilize not only a single format (e.g., a musical piece), but also a plurality of formats associated with the received format video, the user A can easily set the plurality of formats at the time of generating its own format video.

As described above, when the image capture button 56 is selected, image capture (generation) of the format video starts. In an aspect, image capture of the format video starts in response to selection of the image capture button 56, and thereby the generated format video may be streamed live.

When the image capture button 56 is selected, the avatar of the user A may be placed at a predetermined position in the virtual space specified by the format data, the visual field range in the virtual space including the avatar of the user A may be captured, and a video of thus captured virtual space may be displayed on the user device 10*a* of the user A. At this point, generation of a format video has not started. An image capture execution icon (display element) may be displayed on the video shown on the user device 10*a* of the user A, and image capture of a format video may be started by selecting the image capture execution icon. Thus, before starting to generate a format video, the user A can check the generated video by its own user device 10*a* using the selected format data. When determining that the video shown on the user device 10*a* may be generated as a format video, the user A can start to generate the format video by selecting the image capture execution icon. When the display format is checked before a format video is generated, the format data which has been selected before selection of the image capture button 56 can be changed in another format data. After the format data is changed, a format suited to the preference of the user A can be selected by selecting the image capture execution icon before image capture of the format image is performed.

With the above-described video processing method, utilizing the format data (original format data) generated by the user can give an opportunity for the user who has generated the format data to obtain an economic counter value. Thus, the user can be motivated to create unique format data. Also, activation of creation of the format data by users allows the format data available at the time of video creation to be enriched, thus generation of a video by utilizing format data becomes more convenient.

In one aspect, a format video can be generated not through the format data selection screen 50. For example, icons 43 to 47 may be displayed as an overlay on the image 30 shown on the display. The icons 43 to 47 are each an example of a selection element to receive a selection from a user. When the icon 43 is selected, a table of format videos generated by capturing the virtual space A is displayed in the same manner as for the format video of the user C received by the user device 10*a*. FIG. 1*l* shows an example of a video list screen 70 including the list of format videos generated by capturing the virtual space A. The video list screen 70 shows videos 71 to 76 generated by capturing the virtual space A, and an image capture button 77. When the image capture button 77 is selected on the video list screen 70, the avatar of the user A is placed at a predetermined position in the virtual space A. and a format video is generated by capturing the visual field range in the virtual space A with a virtual camera. When a format video is generated through the video list screen 70, there is no need to select format data other than the virtual space identification information, thus a format video can be generated with fewer number of operations.

Figure 12:
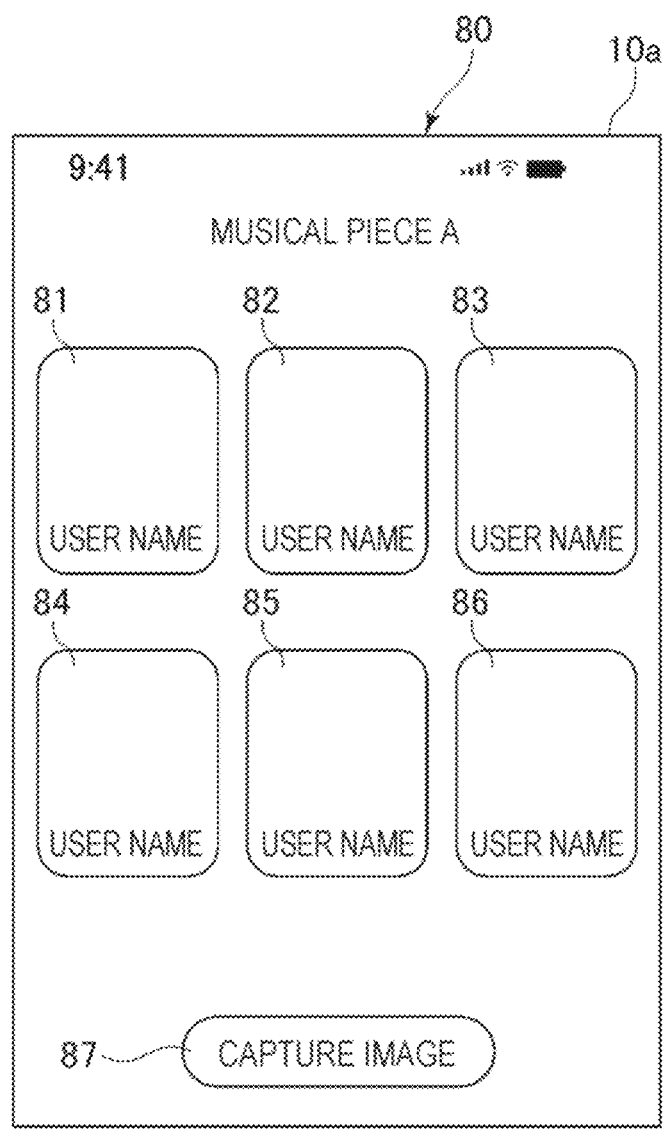
FIG. 12 is a view schematically illustrating a screen including a list of videos which utilize the same musical piece as that of a received video.

When the icon 44 displayed on the image 30 shown on the display is selected, a table of format videos which are set such that the musical piece A is replayed at the time of replay of a video is displayed in the same manner as for the format video received by the user device 10*a*. FIG. 12 shows a video list screen 80 including a list of format videos which are set such that the musical piece A is replayed at the time of replay of the videos. The video list screen 80 shows videos 81 to 86 which are set such that the musical piece A is replayed at the time of replay of the videos, and an image capture button 87. When the image capture button 87 is selected on the video list screen 80, generation of a format video starts. When the image capture button 87 is selected, a virtual space has not been identified yet, thus the avatar may be placed in the home space of the user A. After the image capture button 87 is selected, candidates for a plurality of virtual spaces to be used at the time of generating the format video may be displayed on the user device 10*a*. The user A may select one virtual space from the candidates for the plurality of virtual spaces. The format video when the image capture button 87 is selected may be generated by capturing thus selected visual field range in the virtual space. When thus generated format video is replayed, the musical piece A is also replayed. When a video is streamed through the video list screen 80, there is no need to select format data other than the musical piece information, thus streaming of the format video can be started with fewer number of operations.

When the icon 45 is selected, a video list screen is displayed which includes a table of format videos and an image capture button, the format videos utilizing the same motion A as that of the format video received by the user device 10*a*. When the image capture button is selected on the video list screen, the avatar is placed in the home space of the user A, and image data including the avatar of the user A who performs a series of motions identified by the motion A in the home space is generated. After the image capture button is selected, candidates for a plurality of virtual spaces to be used at the time of generating the format video may be displayed on the user device 10*a*. The user A may select one virtual space from the candidates for the plurality of virtual spaces. The format video when the image capture button is selected may be generated by capturing thus selected visual field range in the virtual space.

When the icon 46 is selected, a video list screen is displayed which includes a table of videos and an image capture button, the videos utilizing the same camera work A as that of the format video received by the user device 10*a*. When the image capture button is selected on the video list screen, the avatar is placed in the home space of the user A, and image data including the avatar of the user A captured with the camera work identified by the camera work A in the home space is generated. After the image capture button is selected, candidates for a plurality of virtual spaces to be used at the time of generating the format video may be displayed on the user device 10*a*. The user A may select one virtual space from the candidates for the plurality of virtual spaces. The format video when the image capture button is selected may be generated by capturing thus selected visual field range in the virtual space.

When the icon 47 is selected, a video list screen is displayed which includes a table of videos and an image capture button, the videos including an avatar wearing the same avatar item as the item worn by the avatar 31 included in the format video received by the user device 10*a*. When the image capture button is selected on the video list screen, the avatar wearing the avatar item is placed in the home space of the user A, and image data including the avatar is generated. When the user A does not own the avatar item worn by the avatar 31, upon selection of the image capture button, transition may be made to a screen that prompts the user A to purchase the avatar item worn by the avatar 31. After the image capture button is selected, candidates for a plurality of virtual spaces to be used at the time of generating the format video may be displayed on the user device 10*a*. The user A may select one virtual space from the candidates for the plurality of virtual spaces. The format video when the image capture button is selected may be generated by capturing thus selected visual field range in the virtual space.

On the image 30, a plurality of icons may be set to be selectable from the icons 43 to 47. When search is executed with a plurality of icons selected, a video list screen may be displayed which includes a table of format videos and an image capture button, the format videos in which pieces of format data corresponding to the selected plurality of icons are each set. On the video list screen, for example, a table of format videos is displayed, the format videos being generated by utilizing the same virtual camera A and camera work A as those of the format video received by the user device 10a. In this manner, upon selection of a plurality of icons from icons 43 to 47, format videos generated by utilizing the format data corresponding to the selected plurality of icons are made searchable, thus format videos suited to the preference of the user A are easily identified.

6. Format Video Uploaded to Server 20

Figure 13:
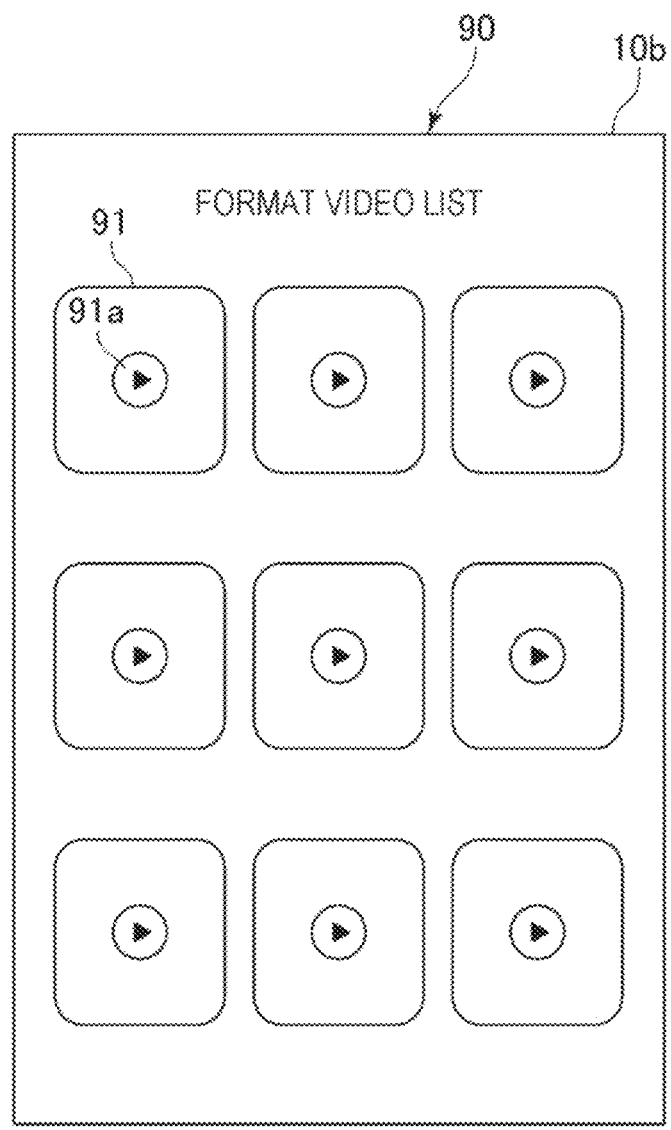
FIG. 13 is a view illustrating a display example of a format video list showing the list of videos streamed by the server.

When a format video is uploaded to the server 20, the server 20 stores the format video in the storage 25 in disclosed state or undisclosed state. In response to instructions from the user who has uploaded the format video, the server 20 may be able to switch the setting of the format video between disclosed state or undisclosed state. In response to a request from a viewing user, the server 20 can transmit a format video list including a table of format videos which are set to disclosed state to the user device of the viewing user. FIG. 13 illustrates an example of a format video list. FIG. 13 illustrates a format video list 90 displayed on the user device 10b of the user B who is a viewing user. On the format video list 90, the thumbnails of a plurality of format videos which are set to disclosed state are displayed. Among these, a thumbnail 91 corresponds to a format video V1 which has been uploaded by the user A in accordance with the flow of FIG. 7.

Each thumbnail includes a replay icon to replay a format video corresponding to the thumbnail. In the example illustrated, the thumbnail 91 includes a replay icon 91a. The user B can replay the format video V1 corresponding to the thumbnail 91 by selecting the replay icon 91a. When the replay icon 91a is selected, the format video V1 is transmitted to the user device 10b of the user B. The format video V1 is replayed in the user device 10b. When the format video V1 is transmitted to the user device 10b in the format of the video data before rendering, the video data of the received format video V1 is processed by a rendering engine in the user device 10b. In this case, the format video V1 includes a set of data necessary to generate the video by a rendering engine.

Figure 14:
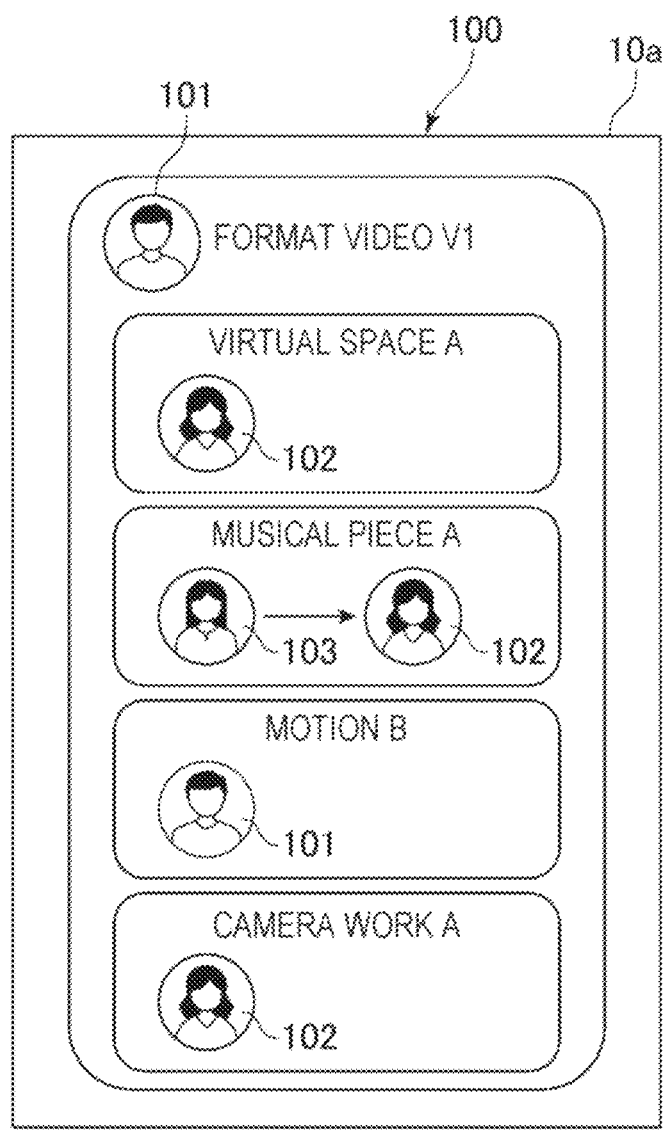
FIG. 14 is a view illustrating a display example of a table of format data associated with video data created by a user.

When the portion of the thumbnail 91, other than the replay icon 91a is selected by the user B, a table of format data associated with the format video V1 may be transmitted to the user device 10b of the user B. FIG. 14 illustrates an example of a format data table associated with the format video V1. FIG. 14 schematically illustrates a format data table 100 displayed on the user device 10b of the user B. On the format data table 100, each of pieces of format data associated with the format video V1 is displayed. As described above, the format video V1 created by the user A is generated by utilizing the virtual space A, the musical piece A, and the camera work A which are associated with the format video streamed by the user C. or by causing the avatar of the user A to perform the motion identified by the motion B uniquely created by the user A. The format data table 100 illustrated in FIG. 14 shows an icon 101 of the user A on the left side of the name (format video V1) of the video to indicate that the format video V1 has been created by the user A. The icons representing the users who have utilized these pieces of format data are displayed below the user A in association with the respective pieces of format data to show a utilization relationship with the virtual space A, the musical piece A, the motion B, and the camera work A which are associated with the format video V1. Since the format video V1 utilizes the virtual space A, the musical piece A, and the camera work A which are associated with the video data streamed by the user C, an icon 102 representing the user C is shown on the display areas corresponding to the virtual space A, the musical piece A, and the camera work A to indicate that these pieces of format data have been taken over from the format video streamed by the user C. As with the virtual space A and the camera work A, the musical piece A is also associated with the video of the user C, but, the original creator of the musical piece A is a user different from the user C, thus an icon 103 representing the original creator of the musical piece A is displayed on the display area corresponding to the musical piece A. In other words, the user C represented by the icon 102 utilizes the musical piece A created by the user represented by the icon 103 at the time of creation of the format video, thus, to show the taken-over relationship, the icon 103 is displayed on the display area of the musical piece A. In this manner, on the display area of format data, an icon (e.g., the icon 103) representing the user who has created the format data for the first time, and an icon (e.g., the icon 102) for the user who has utilized the format data subsequently are displayed to reflect their utilization relationship.

Using the format data table 100, a viewing user can understand the original creator and the subsequent utilization relationship (taken-over relationship) of the format data associated with each video data. The format data table 100 may display information (e.g., an icon) indicating the original creator without displaying a utilization relationship. For example, by following a certain user who has created a viewing user's favorite format data for the first time, the viewing user can receive a notice when the certain user creates new format data. When format data is utilized to generate a format video by another user, the original creator of the format data can receive a notice. On the user terminal of each user of the video processing system 1, a table of format videos generated by utilizing the format data (original format data) produced by the user may be displayed for each original format. For example, when the user A creates a first original format and a second original format, a list (a first utilization video list) of format videos generated by utilizing the first original format, and a list (a second utilization video list) of format videos generated by utilizing the second original format may be displayed on the user device 10a of the user A.

The format data illustrated in FIG. 14 may also be utilized when another user creates a format video. Selection of an area corresponding to any format data by the user B may generate a table of format videos utilizing the format data. For example, when a display area corresponding to the motion B is selected, a table of format videos created utilizing the motion B may be generated, and the generated table of format videos may be displayed on the user device 10b of the user B.

7. Utilization Availability Setting of Format Data

As described above, it is assumed that format data associated with a format video is utilized by a user who has received the format video, as a format to create a format video of the user. However, when the format video includes original format data, some users may not want another user to utilize the original format data. Thus, the video processing system 1 may provide, to each user, a function of setting whether utilization of the format data by another user is permitted. For example, a list of original format data associated with a user is created in the server 20, and in the list, for each format data, utilization availability by other users may be set. Utilization availability for original format data may be set for each original format data. Utilization availability for original format data may be set for each format video. For example, when the user A creates a first format video and a second format video, and both are associated with original format data A, utilization of the original format data A associated with the first format video may be permitted, whereas utilization of the original format data A associated with the second format video may not be permitted.

Figure 15:
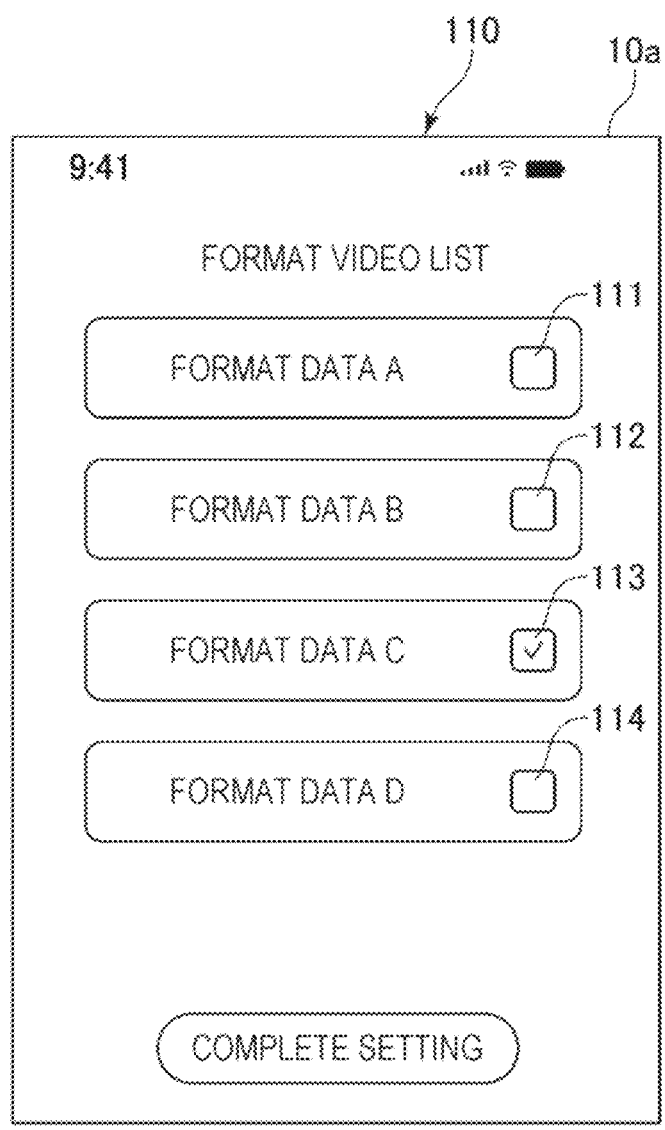
FIG. 15 is a view schematically illustrating a screen to set availability of utilization of format data by other users.

FIG. 15 illustrates an example of a list display screen 110 including a list of the original format data associated with the user A. The list display screen 110 is displayed on the user device 10*a* of the user A. The list display screen 110 shows four format data, format data A to D, and corresponding check boxes 111 to 114, respectively. The user A can prohibit utilization of format data by checking the check box of the format data which is not granted for use. In the example illustrated, the check box 113 of the format data C is checked, thus the format data C cannot be utilized by any user other than the user A at the time of video creation. For example, in a user device which has received a video associated with the format data C, format data corresponding to the format data C can be grayed out to be unselectable on the format data selection screen 50. The format data corresponding to the format data C does not need to be displayed on the format data selection screen 50.

8. Start of Image Capture (Generation) of Format Video

The flow illustrated in FIG. 7 shows an aspect in which the user A obtains a format video created by another user (user C), and starts to create a format video by utilizing the format data associated with the format video. In the video processing system 1, in an aspect other than the aspect illustrated in FIG. 7, image capture of the format video can be started. For example, for each virtual space, an image capture location set by a user where a format image is to be captured can be stored. When transition to an image capture mode is made while the user A is searching in a virtual space utilizing an avatar, a list of image capture locations within a predetermined distance from the position of the avatar of the user A at the time of transition to the image capture mode is displayed on the user device 10*a* of the user A. The list of image capture locations includes, in association with each image capture location, a format video captured at the image capture location and format data associated with the format video. The user A selects, from the list, an image capture location and one or multiple of the pieces of format data associated with a format video captured at the image capture location, thus can create a format video by utilizing the selected format data and capturing a virtual space so as to include the selected image capture location in the visual field range of a virtual camera. Consequently, the user A can easily identify the image capture location in the virtual space being utilized, and can further generate video data easily by utilizing the format data associated with the format video captured at the image capture location.

In an aspect, image capture of a format video by a user may be started during streaming of a normal video by the user. For example, during streaming of a normal video by the user, an icon (display element) to start image capture of a format video may be displayed on the user device of the user. The user may be able to start image capture of a format video during streaming of a normal video by selecting the icon to start image capture of the format video in the user terminal. Image capture of the format video may be performed at the time of streaming a normal video by utilizing the virtual space where the avatar of the user is placed. The format video created in this manner may be generated or streamed in a format different from that of normal video. For example, even when a normal video is streamed by the client rendering method, the format video may be generated or streamed by the image streaming method or the server rendering method.

In an aspect, after streaming of a normal video is completed, the user may create a format video and format data using the video data used for streaming the normal video. The format video may be part of the normal video. For example, when a normal video is streamed for 60 minutes, the user may select, as the format video, a video corresponding to part (e.g., one minute in the middle of streaming) of the entire normal video. The format data can be generated based on the video data in a selected section of the normal video. For example, information to identify the camera work included in the selected section of the normal video can be set as format data (virtual camera setting information). Part of the normal video may be selected after the start of streaming the normal video, and before the end of streaming.

A user who views a normal video may capture a format video including its own avatar by utilizing the video data of the normal video when the avatar is displayed on the normal video.

9. Notes

The video processing system 1 illustrated in FIG. 1 is an example of a system to which the present disclosure is applicable, and the system to which the present disclosure is applicable is not limited to the system illustrated in FIG. 1. The video processing system 1 to which the present disclosure is applicable may not include part of the components illustrated. The video processing system 1 may include a cloud environment to apply distributed processing to the process to be performed by the user device 10 or the server 20.

In the video processing system 1, there is no specific restriction on the storage location of data. For example, various data storable in the storage 25 may be stored in a storage or a database server which is physically separated from the storage 25. In the present disclosure, the data which is described to be stored in the storage 25 may be stored in a single storage, or may be stored in a plurality of storages in a distributed manner. In the present disclosure and the claims, a "storage" may indicate either a single storage or a set of a plurality of storages as far as the context allows.

The embodiment of the present disclosure is not limited to the above-described embodiment, and various modifications may be made in a range not departing from the gist of the disclosure. For example, part or all of the functions executed by the processor 11 may be implemented by the processor 21 or a processor not specified in a range not departing from the gist of the disclosure. Similarly, part or all of the functions executed by the processor 21 may be implemented by the processor 11 or a processor not specified in a range not departing from the gist of the disclosure. Although the processor 11 is illustrated as a single component in FIG. 3, and the processor 21 is illustrated as a single component in FIG. 4, each of the processor 11 and the processor 21 may be a set of plurality of physically separated processors.

In the present disclosure, programs or the commands contained in the programs which are described to be executed by the processor 11 may be executed by a single processor, or executed by a plurality of processors in a distributed manner. The programs or the commands contained in the programs to be executed by the processor 11 may be executed by one or a plurality of virtual processors. The description of the processor 11 in this paragraph also applies to the processor 21.

The programs to be executed by the processor 11 and/or the processor 21 may be stored in various types of non-transitory computer readable medium other than the illustrated storage. The non-transitory computer readable medium includes various types of tangible storage medium. Examples of non-transitory computer readable medium include a magnetic recording medium (e.g., a flexible disk, a magnetic tape, a hard disk drive), a magneto-optical recording medium (e.g., a magneto-optical disk), a compact disc read only memory (CD-ROM), a CD-R, a CD-R/W, and a semiconductor memory (e.g., a mask ROM, a programmable ROM (PROM), an erasable PROM (EPROM), a flash ROM, a random access memory (RAM)).

Although the processes and procedures explained in the present disclosure are described to be executed by a single device, software, a component, or a module, such processes or procedures may be executed by a plurality of devices, a plurality of pieces of software, a plurality of components, and/or a plurality of modules. Although the data, tables or databases explained in the present disclosure are described to be stored in a single memory, such data, tables or databases may be stored in a distributed manner in a plurality of memories included in a single device or in a plurality of memories dispersedly disposed in a plurality of devices. Furthermore, the elements of software and hardware explained in the present disclosure can be implemented by integrating the elements into fewer components or decomposing the elements into more components.

In the processing procedure explained in the present disclosure, particularly, in the processing procedure explained using a flow diagram or a sequence diagram, it is possible to omit part of the processes (steps) included in the processing procedure, to add an unspecified process as a process included in the processing procedure, and/or to change the order of processes, and a processing procedure which undergoes such omission, addition, change of order is also included in the scope of the present disclosure unless departing from the gist of the present disclosure.

An expression such as "the first", "the second", "the third" in the present disclosure and the claims is labeled to identify a component, and not necessarily intended to limit the number, order, or its content. Also, a number to identify a component is used for each context, and a number used in one context does not necessarily indicate the same configuration in another context. A component identified by a number may also provide the function of a component identified by another number.

The function of the user device 10 and the server 20 may vary according to the rendering method. For example, when the client rendering method is adopted, the user device 10 needs to have a function of rendering video data, however, when the server rendering method is adopted, the user device 10 does not necessarily need to have a function of rendering video data. For example, at least part of the function of the video replayer 11*b* described as the function of the user device 10*a* may be implemented as the function of the server 20.

10. Appendix

In the present disclosure, the techniques in the following pages are also disclosed.

[Appendix 1]

A video processing method executed by one or a plurality of processors, the video processing method comprising:
  obtaining one or a plurality of format elements used to generate a first video including a first avatar in a virtual space; and
  generating a second video including a second avatar different from the first avatar using one or a plurality of selection format elements selected from the one or a plurality of format elements.

[Appendix 2]

The video processing method according to [Appendix 1], wherein the one or a plurality of format elements include virtual space identification information that identifies the virtual space.

[Appendix 3]

The video processing method according to [Appendix 2], wherein when the virtual space identification information is selected as the one or a plurality of selection format elements, the second avatar is placed in the virtual space in the second video.

[Appendix 4]

The video processing method according to any one of [Appendix 1] to [Appendix 3],
  wherein the first video includes the first avatar captured by a virtual camera in the virtual space, and
  the one or a plurality of format elements include coordinate information that identifies a position of the first avatar in the virtual space at a time of image capture.

[Appendix 5]

The video processing method according to [Appendix 4], wherein when the coordinate information is selected as the one or a plurality of selection format elements, the second avatar is placed at the position identified by the coordinate information in the virtual space in the second video.

[Appendix 6]

The video processing method according to any one of [Appendix 1] to [Appendix 5],
  wherein the first video includes the first avatar captured by a virtual camera in the virtual space, and
  the one or a plurality of format elements include image capture setting information of the virtual camera at a time of image capture.

[Appendix 7]

The video processing method according to [Appendix 6], wherein when the image capture setting information is selected as the one or a plurality of selection format elements, the second video is generated to include the second avatar that is captured in the virtual space in accordance with the image capture setting information.

[Appendix 8]

The video processing method according to any one of [Appendix 1] to [Appendix 7],
  wherein the first video includes the first avatar captured by a virtual camera in the virtual space, and
  the one or a plurality of format elements include motion information that identifies a motion of the first avatar at a time of image capture.

[Appendix 9]
The video processing method according to [Appendix 8], wherein when the motion information is selected as the one or a plurality of selection format elements, the second video is generated to include the second avatar that moves in accordance with the motion information.

[Appendix 10]
The video processing method according to any one of [Appendix 1] to [Appendix 9],
wherein the first video includes the first avatar captured by a virtual camera in the virtual space, and
the one or a plurality of format elements include object information that identifies an object which is placed in the virtual space at a time of image capture in association with the first avatar.

[Appendix 11]
The video processing method according to [Appendix 10], wherein when the object information is selected as the one or a plurality of selection format elements, the second avatar is displayed in the second video in association with the object identified by the object information.

[Appendix 12]
The video processing method according to any one of [Appendix 1] to [Appendix 11], wherein the one or a plurality of format elements include musical piece information that identifies a musical piece to be replayed in synchronization with an image in the first video.

[Appendix 13]
The video processing method according to [Appendix 12], wherein when the musical piece information is selected as the one or a plurality of selection format elements, the musical piece identified by the musical piece information is replayed in synchronization with an image including the second avatar at a time of viewing of the second video.

[Appendix 14]
The video processing method according to any one of [Appendix 1] to [Appendix 13], wherein one or a plurality of selection elements to select the one or a plurality of selection format elements from the one or a plurality of format elements are displayed along with the first video.

[Appendix 15]
The video processing method according to [Appendix 14],
wherein the one or a plurality of format elements include a first format element,
the one or a plurality of selection elements include a first selection element to select the first format element, and
in response to detection of selection of the first selection element, video information on a video generated using the first format element is displayed.

[Appendix 16]
The video processing method according to [Appendix 14],
wherein the one or a plurality of format elements include a first format element,
the one or a plurality of selection elements include a first selection element to select the first format element, and
in response to detection of selection of the first selection element, format information on the first format element is displayed.

[Appendix 17]
The video processing method according to any one of [Appendix 1] to [Appendix 16], wherein the generating the second video includes changing at least part of the one or a plurality of selection format elements to another format element.

[Appendix 18]
The video processing method according to any one of [Appendix 1] to [Appendix 17], wherein at least one format element included in the one or a plurality of format elements is available to generate the second video under a condition of payment of counter value.

[Appendix 19]
The video processing method according to any one of [Appendix 1] to [Appendix 18], wherein at least one format element included in the one or a plurality of format elements is tokenized as a non-fungible token.

[Appendix 20]
The video processing method according to any one of [Appendix 1] to [Appendix 19], further comprising replaying the first video generated based on the one or a plurality of format elements.

[Appendix 21]
A video processing method executed by one or a plurality of processors, the video processing method comprising:
obtaining a plurality of format elements used to generate a first video including a first avatar; and
generating a second video including a second avatar different from the first avatar based on one or a plurality of selection format elements selected from the plurality of format elements.

[Appendix 22]
An image processing system comprising one or a plurality of processors, wherein execution of a computer-processable command by the one or a plurality of processors causes
one or a plurality of format elements to be obtained, the one or a plurality of format elements being used to generate a first video including a first avatar in a virtual space; and
a second video including a second avatar different from the first avatar to be generated using one or a plurality of selection format elements selected from the one or a plurality of format elements.

[Appendix 23]
A video processing program causing one or a plurality of processors to execute a process comprising:
obtaining one or a plurality of format elements used to generate a first video including a first avatar in a virtual space; and
generating a second video including a second avatar different from the first avatar using one or a plurality of selection format elements selected from the one or a plurality of format elements.

What is claimed is:
1. A video processing method executed by processing circuitry, the video processing method comprising:
obtaining at least one format element which is used to generate a first video including a first avatar in a virtual space; and
generating a second video, including a second avatar different from the first avatar, using a selection format element which is selected from the at least one format element.

2. The video processing method according to claim 1, wherein the at least one format element includes virtual space identification information that identifies the virtual space.

3. The video processing method according to claim 2, wherein in a case that the virtual space identification information is selected as the selection format element, the second avatar is placed in the virtual space in the second video.

4. The video processing method according to claim 1, wherein
the first video includes the first avatar captured by a virtual camera in the virtual space, and
the at least one format element includes coordinate information that identifies a position of the first avatar in the virtual space at a time of image capture.

5. The video processing method according to claim 4, wherein in a case that the coordinate information is selected as the selection format element, the second avatar is placed at the position identified by the coordinate information in the virtual space in the second video.

6. The video processing method according to claim 1, wherein
the first video includes the first avatar captured by a virtual camera in the virtual space, and
the at least one format element includes image capture setting information of the virtual camera at a time of image capture.

7. The video processing method according to claim 6, wherein in a case that the image capture setting information is selected as the selection format element, the second video is generated to include the second avatar that is captured in the virtual space in accordance with the image capture setting information.

8. The video processing method according to claim 1, wherein
the first video includes the first avatar captured by a virtual camera in the virtual space, and
the at least one format element includes motion information that identifies a motion of the first avatar at a time of image capture.

9. The video processing method according to claim 8, wherein in a case that the motion information is selected as the selection format element, the second video is generated to include the second avatar that moves in accordance with the motion information.

10. The video processing method according to claim 1, wherein
the first video includes the first avatar captured by a virtual camera in the virtual space, and
the at least one format element includes object information that identifies an object in association with the first avatar, the object being placed in the virtual space at a time of image capture.

11. The video processing method according to claim 10, wherein in a case that the object information is selected as the selection format element, the second avatar is displayed in the second video in association with the object identified by the object information.

12. The video processing method according to claim 1, wherein the at least one format element includes musical piece information that identifies a musical piece to be replayed in synchronization with an image in the first video.

13. The video processing method according to claim 12, wherein in a case that the musical piece information is selected as the selection format element, the musical piece identified by the musical piece information is replayed in synchronization with an image including the second avatar at a time of viewing of the second video.

14. The video processing method according to claim 1, wherein a selection element to select at least one of selection format elements is displayed along with the first video.

15. The video processing method according to claim 14, wherein
the at least one format element includes a first format element,
the selection element includes a first selection element to select the first format element, and
in response to detection of selection of the first selection element, video information on a video generated using the first format element is displayed.

16. The video processing method according to claim 14, wherein
the at least one format element includes a first format element,
the selection element includes a first selection element to select the first format element, and
in response to detection of selection of the first selection element, format information on the first format element is displayed.

17. The video processing method according to claim 1, wherein
the at least one format element is a plurality of format elements, and
the generating the second video further includes changing at least part of the selection format element to another format element of the plurality of format elements.

18. The video processing method according to claim 1, wherein the at least one format element is available to generate the second video under a condition of payment of counter value.

19. The video processing method according to claim 1, wherein the at least one format element is tokenized as a non-fungible token.

20. The video processing method according to claim 1, further comprising replaying the first video generated based on the at least one format element.

21. An image processing system, comprising:
processing circuitry configured to
obtain at least one format element which is used to generate a first video including a first avatar in a virtual space; and
generate a second video, including a second avatar different from the first avatar, using a selection format element which is selected from the at least one format element.

22. A non-transitory computer readable medium storing computer executable instructions which, when executed by processing circuitry, cause the processing circuitry to execute a process comprising:
obtaining at least one format element which is used to generate a first video including a first avatar in a virtual space; and
generating a second video, including a second avatar different from the first avatar, using a selection format element which is selected from the at least one format element.

* * * * *